US012647720B2

(12) United States Patent
Kim et al.

(10) Patent No.: US 12,647,720 B2
(45) Date of Patent: Jun. 2, 2026

(54) DISPLAY APPARATUS

(71) Applicant: LG Display Co., Ltd., Seoul (KR)

(72) Inventors: Taehyung Kim, Paju-si (KR); MinJin Lee, Paju-si (KR); YoungYoon You, Paju-si (KR); GyungBo Ha, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 386 days.

(21) Appl. No.: 18/484,364

(22) Filed: Oct. 10, 2023

(65) Prior Publication Data

US 2024/0048896 A1 Feb. 8, 2024

Related U.S. Application Data

(63) Continuation of application No. 17/071,472, filed on Oct. 15, 2020, now Pat. No. 11,825,263.

(30) Foreign Application Priority Data

Oct. 23, 2019 (KR) ........................ 10-2019-0132514

(51) Int. Cl.
*H04R 1/28* (2006.01)
*F21V 8/00* (2006.01)
(Continued)

(52) U.S. Cl.
CPC ......... *H04R 1/2834* (2013.01); *G02B 6/0055* (2013.01); *G02F 1/133308* (2013.01); *H04R 1/2807* (2013.01); *H04R 1/2811* (2013.01); *H04R 1/2815* (2013.01); *H04R 1/283* (2013.01); *G02F 1/133314* (2021.01); *G09G 3/3677* (2013.01); *H04R 1/028* (2013.01);
(Continued)

(58) Field of Classification Search
CPC ...... H04R 1/025; H04R 1/028; H04R 1/2807; H04R 1/2811; H04R 1/2815; H04R 1/283; H04R 1/2834; H04R 1/345; H04R 5/02; H04R 2440/01; H04R 2440/05; H04R 2499/15
See application file for complete search history.

(56) References Cited

U.S. PATENT DOCUMENTS 7,565,949 B2 7/2009 Tojo
10,341,474 B1 7/2019 Hidaka et al.
(Continued)

FOREIGN PATENT DOCUMENTS

CN 1581891 A 2/2005
CN 1315361 C 5/2007
(Continued)

OTHER PUBLICATIONS

German Office Action for Application No. 102020127279.0, dated May 25, 2023, 14 pages.
(Continued)

*Primary Examiner* — Huyen D Le
(74) *Attorney, Agent, or Firm* — Morgan, Lewis & Bockius LLP

(57) ABSTRACT

A display apparatus may include a rear cover at a rear surface of a display module and a vibration generating module at a rear region of the rear cover. The vibration generating module may be configured to output sound in a forward direction and a lateral direction of the display module.

33 Claims, 16 Drawing Sheets

(51) Int. Cl.
    *G02F 1/1333*    (2006.01)
    *G09G 3/36*    (2006.01)
    *H04R 1/02*    (2006.01)
    *H04R 1/34*    (2006.01)

(52) U.S. Cl.
    CPC .......... *H04R 1/345* (2013.01); *H04R 2440/01* (2013.01); *H04R 2440/05* (2013.01); *H04R 2499/15* (2013.01)

(56) References Cited

U.S. PATENT DOCUMENTS

| | | | |
|---|---|---|---|
| 10,609,487 | B2 | 3/2020 | Lee et al. |
| 10,820,082 | B2 | 10/2020 | Lee |
| 10,893,346 | B2 | 1/2021 | Kang et al. |
| 10,921,852 | B2 | 2/2021 | Choi et al. |
| 2002/0107044 | A1 | 8/2002 | Kuwata et al. |
| 2005/0024349 | A1 | 2/2005 | Shon |
| 2005/0025330 | A1 | 2/2005 | Saiki et al. |
| 2005/0237685 | A1 | 10/2005 | Miyata |
| 2006/0078138 | A1 | 4/2006 | Hiroshi |
| 2007/0071259 | A1 | 3/2007 | Tojo |
| 2007/0132911 | A1 | 6/2007 | Fujiwara et al. |
| 2007/0223744 | A1 | 9/2007 | Wada |
| 2011/0311086 | A1 | 12/2011 | Nakamura et al. |
| 2012/0243719 | A1 | 9/2012 | Franklin et al. |
| 2013/0128130 | A1 | 5/2013 | Yamauchi et al. |
| 2014/0247959 | A1* | 9/2014 | Yamanaka ............. H04R 1/345 381/388 |
| 2017/0280216 | A1* | 9/2017 | Lee .......................... H04R 5/02 |
| 2017/0280243 | A1 | 9/2017 | Choi et al. |
| 2019/0037164 | A1 | 1/2019 | Kim et al. |
| 2019/0149908 | A1 | 5/2019 | Kim et al. |
| 2019/0182573 | A1 | 6/2019 | Shin et al. |
| 2019/0208300 | A1 | 7/2019 | Lee et al. |
| 2019/0272058 | A1 | 9/2019 | Noma |
| 2020/0162804 | A1 | 5/2020 | Shin et al. |

FOREIGN PATENT DOCUMENTS

| | | | |
|---|---|---|---|
| CN | 204929153 | U | 12/2015 |
| CN | 108810759 | A | 11/2018 |
| CN | 108877597 | A | 11/2018 |
| CN | 109326236 | A | 2/2019 |
| CN | 109791742 | A | 5/2019 |
| CN | 109922412 | A | 6/2019 |
| CN | 109961725 | A | 7/2019 |
| CN | 109963242 | A | 7/2019 |
| CN | 109994060 | A | 7/2019 |
| CN | 110139197 | A | 8/2019 |
| JP | 2003111194 | A | 4/2003 |
| JP | 2004-096273 | A | 3/2004 |
| JP | 2005-110216 | A | 4/2005 |
| JP | 2006-100898 | A | 4/2006 |
| JP | 2006-237826 | A | 9/2006 |
| JP | 2007-166008 | A | 6/2007 |
| JP | 2007-256572 | A | 10/2007 |
| JP | 2007256571 | A | 10/2007 |
| JP | 2008-193486 | A | 8/2008 |
| JP | 2009-189050 | A | 8/2009 |
| JP | 2012-249331 | A | 12/2012 |
| JP | 2014-171049 | A | 9/2014 |
| JP | 2015-037199 | A | 2/2015 |
| JP | 2015-103959 | A | 6/2015 |
| JP | 2016-072655 | A | 5/2016 |
| JP | 2017-054021 | A | 3/2017 |
| JP | 2019-15803 | A | 1/2019 |
| JP | 2019-041326 | A | 3/2019 |
| KR | 10-1919454 | B1 | 11/2018 |
| KR | 10-2019-0070567 | A | 6/2019 |
| TW | 200721873 | A | 6/2007 |
| WO | 2004004408 | A1 | 1/2004 |
| WO | 2012/153537 | A1 | 11/2012 |
| WO | 2015040686 | A1 | 3/2015 |
| WO | 2015/076407 | A1 | 5/2015 |
| WO | 2018139462 | A1 | 8/2018 |

OTHER PUBLICATIONS

Taiwan Office Action for Application No. 111127425, dated May 2, 2023, 5 pages.

Japanese Office Action for Application No. 2022-047276, dated Apr. 18, 2023, 3 pages.

Office Action dated Oct. 28, 2025 issued in the corresponding Chinese Divisional Patent Application No. 202310264667.1.

Office Action dated Nov. 1, 2025 issued in the corresponding Chinese Divisional Patent Application No. 202310261484.4.

Office Action, issued in corresponding Japanese Patent Application No. 2020-176917, dated Oct. 29, 2021.

Japanese Office Action Report dated Jun. 15, 2021, issued in corresponding Japanese Patent Application No. 2020-176917.

Taiwanese Office Action dated Oct. 14, 2021, issued in corresponding Taiwanese Patent Application No. 109136287.

Office Action issued in corresponding Korean Patent Application No. 10-2019-0132514, dated Mar. 28, 2024. (Note: US 2007/0223744 A1 and US 2014/0247959 A1 were previously cited).

Office Action dated Jun. 27, 2022, issued in corresponding Chinese Patent Application No. 202011105614.8, 9 pages.

Office Action issued in corresponding Japanese Patent Application No. 2023-197064, dated Sep. 18, 2024. (Note: JP 2014-171049 A, Jp 2006-237826 A, WO 2015/076407 A1 and US 2019/0182573 A1 were previously cited).

Office Action dated Nov. 1, 2025 issued in the corresponding Chinese Patent Application No. 202310271171.7. (Note: CN 204929153 U, and JP 2007-256571 A already submitted.).

\* cited by examiner

DISPLAY APPARATUS

CROSS-REFERENCE TO RELATED APPLICATIONS

This application is a continuation of application Ser. No. 17/071,472, filed on Oct. 15, 2020, which claims the benefit of and priority to the Korean Patent Application No. 10-2019-0132514 filed on Oct. 23, 2019, the entirety of each of which is hereby incorporated by reference as if fully set forth herein.

BACKGROUND

Technical Field

The present disclosure relates to a display apparatus, and more particularly, to a display apparatus including a display panel for outputting sound.

Discussion of the Related Art

Generally, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound device for outputting a sound associated with the image.

However, in display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and an immersion experience of a viewer is reduced.

SUMMARY

Accordingly, embodiments of the present disclosure are directed to a display apparatus that substantially obviates one or more problems due to limitations and disadvantages of the related art.

The inventors have recognized problems of the display apparatuses as above-mentioned and have performed various experiments so that, when a user in front of a display panel is watching an image, a traveling direction of sound is toward a front surface of the display panel. Thus, sound quality may be enhanced. Thus, through the various experiments, the inventors have invented a display apparatus having a new structure that may generate sound traveling to a forward region in front of the display panel, thereby enhancing sound quality.

An aspect of the present disclosure is to provide a display apparatus for providing improved sound quality and increasing an immersion experience of a viewer.

Another aspect of the present disclosure is to provide a display apparatus which generates sound for traveling to a forward region in front of a display module.

Another aspect of the present disclosure is to providing a display apparatus which generates sound for traveling to a forward region in front and a lateral region in side of a display module.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other inventive concepts, as embodied and broadly described herein, a display apparatus comprises a display module including a display panel and configured to display an image, a rear cover at a rear surface of the display module, and a vibration generating module at a rear region of the rear cover, wherein the vibration generating module is configured to output sound in a forward direction and a lateral direction with respect to the display module.

In another aspect, a display apparatus comprises a display module including a display panel and configured to display an image, a rear cover at a rear surface of the display module, and a vibration generating module at a rear region of the rear cover and configured to output a sound to the display module, wherein the rear cover and the vibration generating module are disposed in non-parallel.

According to an embodiment of the present disclosure, a display apparatus for outputting sound to a forward region in front and a lateral region in side of a display module may be provided.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
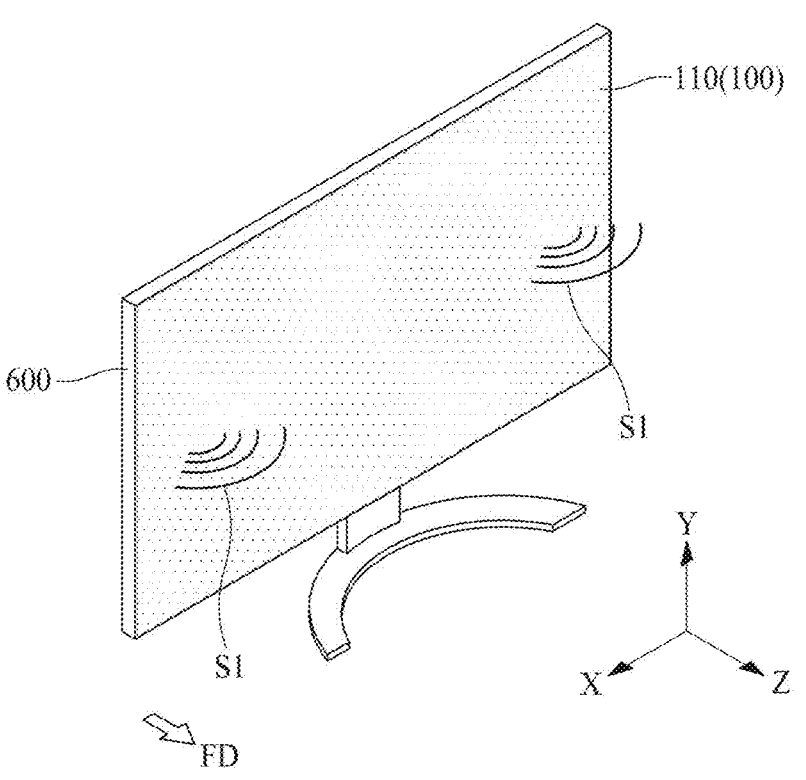
FIG. 1 illustrates a display apparatus according to an embodiment of the present disclosure.

Reference will now be made in detail to the exemplary embodiments of the present disclosure, examples of which may be illustrated in the accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

Throughout the drawings and the detailed description, unless otherwise described, the same drawing reference numerals should be understood to refer to the same elements, features, and structures. The relative size and depiction of these elements may be exaggerated for clarity, illustration, and convenience. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details Like reference numerals refer to like elements throughout. In the following description, when the detailed description of the relevant known technology is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted. Also, for convenience of description, a scale of each of elements illustrated in the accompanying drawings differs from a real scale, and thus, is not limited to a scale illustrated in the drawings.

A display apparatus according to an embodiment of the present disclosure may include a vibration generating module. When the display apparatus is configured with a sound generating device which is the vibration generating module, there is a problem where it is difficult to secure a sound of a high-pitched sound band, due to complicated structures of the display apparatus. In order to solve the problem, the display apparatus according to an embodiment of the present disclosure may further include a piezoelectric vibration device including a piezoelectric material or a piezoelectric device having a piezoelectric effect (or an inverse piezoelectric characteristic) where an output of the high-pitched sound band is strong. When the piezoelectric vibration device is provided, the cost of the display apparatus increases, and a separate element for implementing a sound signal in the piezoelectric vibration device is needed, causing an increase in cost. Therefore, the inventors have performed various experiments for realizing a sound of the high-pitched sound band without the piezoelectric vibration device. Through the various experiments, the inventors have invented a display apparatus having a new structure. This will be described below.

FIG. 1 illustrates a display apparatus according to an embodiment of the present disclosure.

With reference to FIG. 1, the display apparatus according to an embodiment of the present disclosure may output sound S1 based on a vibration of a display module 100 configured to display an image. For example, in the display apparatus, the display module 100 may vibrate by a vibration generating device (or a sound generating device) to generate the sound S1. The sound S1 generated based on the vibration of the display module 100 may be directly output to a screen forward region FD (or forward direction) in front of the display apparatus. Therefore, by using the display module 100 as a vibration plate for generating a sound, the display apparatus according to an embodiment of the present disclosure may output the sound S1 to the screen forward region FD in front of the display apparatus, thereby enabling the transfer of an accurate sound, improving sound quality, and increasing an immersion experience of a viewer.

Figure 2:
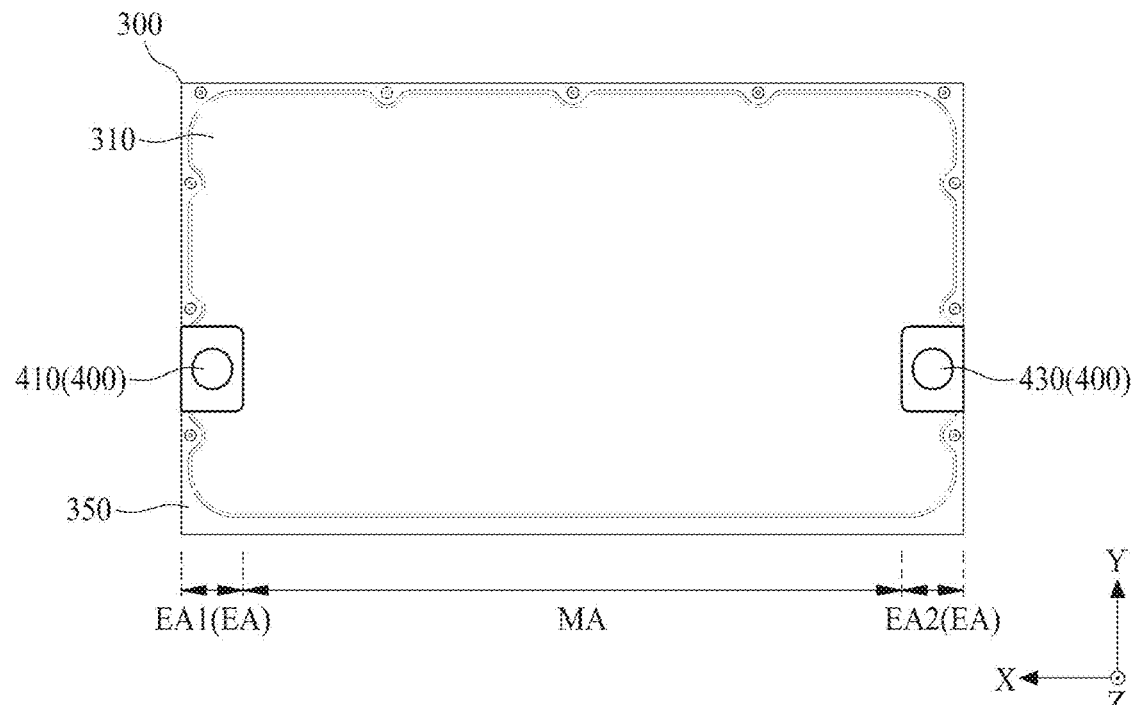
FIG. 2 illustrates a rear surface of a display apparatus according to an embodiment of the present disclosure.
Figure 3:
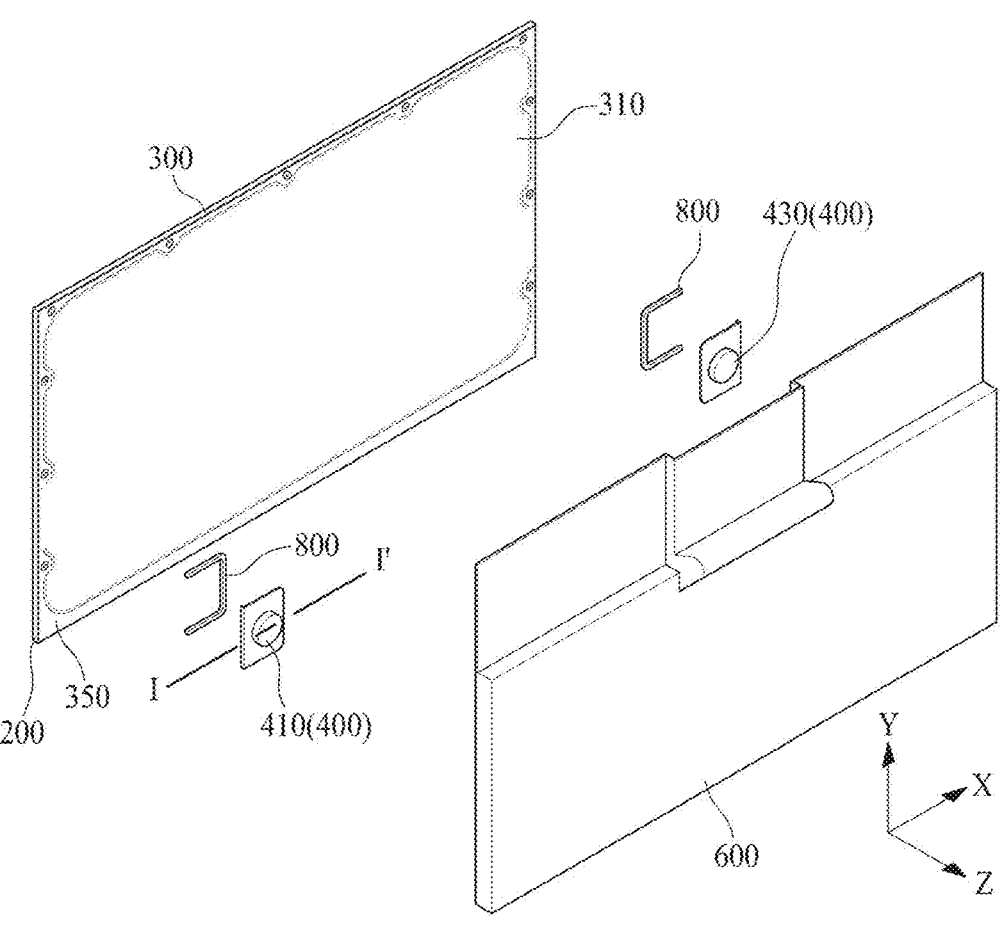
FIG. 3 is an exploded view of a display apparatus according to an embodiment of the present disclosure.
Figure 4:
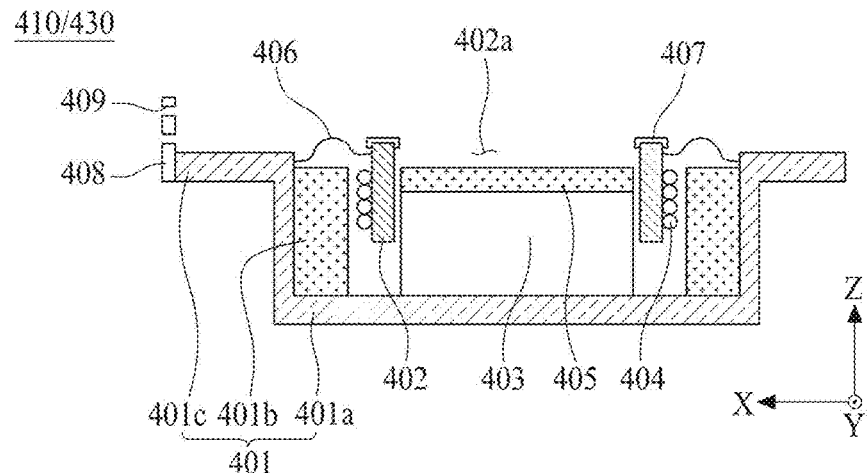
FIG. 4 illustrates a sound generating device according to an embodiment of the present disclosure.
Figure 5:
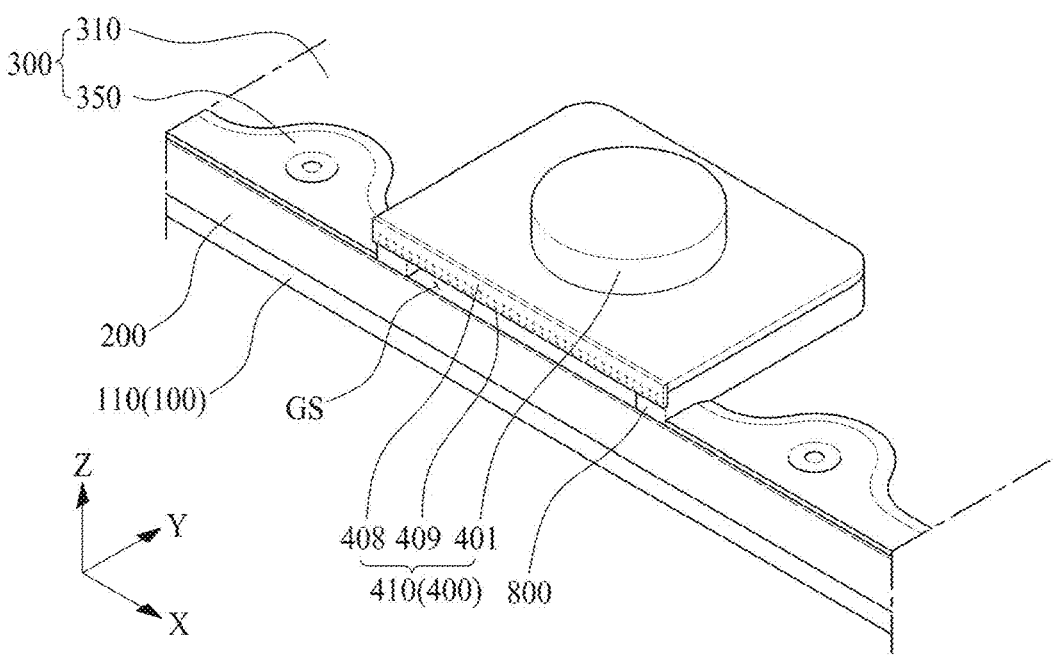
FIG. 5 is a view from above of a display apparatus according to an embodiment of the present disclosure.
Figure 6:
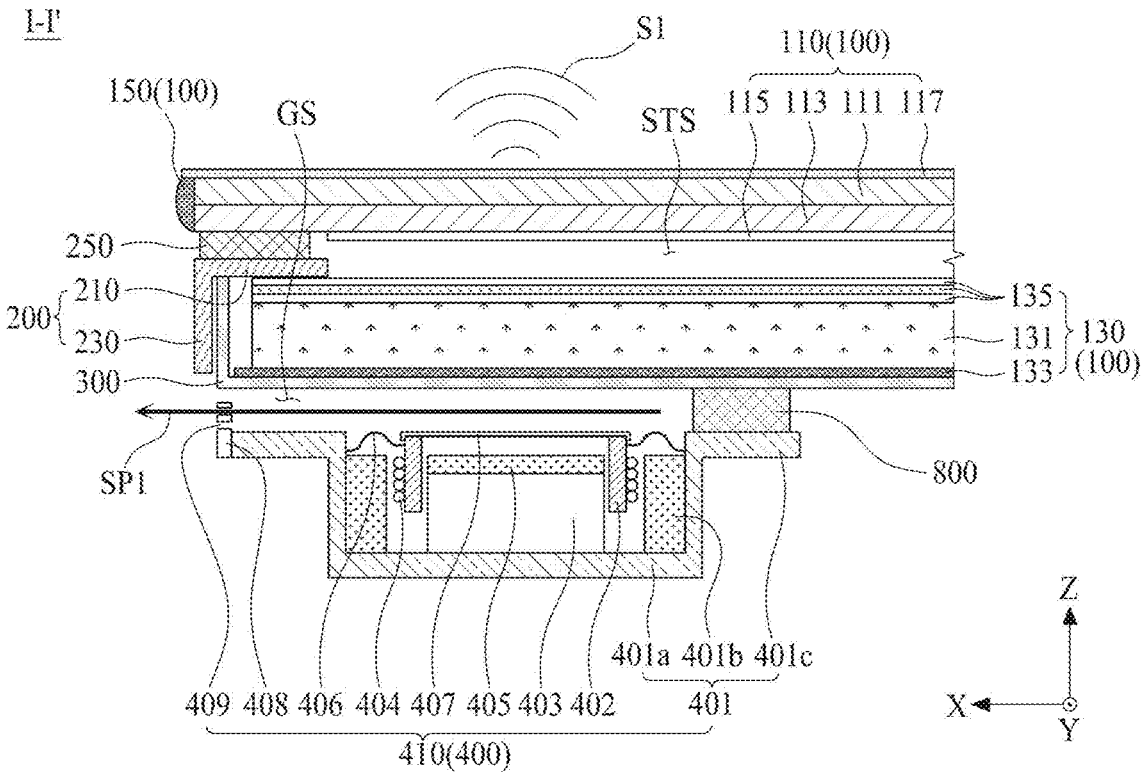
FIG. 6 is a cross-sectional view taken along line I-I' illustrated in FIG. 3.

FIG. 2 illustrates a rear surface of a display apparatus according to an embodiment of the present disclosure. FIG. 3 is an exploded view of a display apparatus according to an embodiment of the present disclosure. FIG. 4 illustrates a sound generating device according to an embodiment of the present disclosure. FIG. 5 is a view from above of a display apparatus according to an embodiment of the present disclosure. FIG. 6 is a cross-sectional view taken along line I-I' illustrated in FIG. 3.

With reference to FIGS. 2 to 6, the display apparatus according to an embodiment of the present disclosure may include a display module 100, a supporting part 200, a rear cover 300, and a vibration generating module 400.

The display module 100 may be a liquid crystal display module, but embodiments of the present disclosure are not limited thereto. For example, the display module 100 may be a display module such as a light emitting display module, an electrophoretic display module, a micro light emitting diode display module, an electrowetting display module, or a quantum dot light emitting display module.

The rear cover 300 may be configured to support the supporting part (or panel guide or panel guide part) 200, and may cover a rear surface of the display module 100. Also, the rear cover 300 may be configured to support the vibration generating module 400. The rear cover 300 may also act as a vibration plate, and thus, may include a metal material or a metal alloy material. For example, the rear cover 300 may include a material among a Fe material, an Al material, a Mg alloy material, a Mg—Li alloy material, and an Al alloy material, but embodiments of the present disclosure are not limited thereto. When a rear cover 300 includes a material including nonferrous metal, a sound of a low-pitched sound band of a vibration generating module 400 may be more enhanced. For example, when the rear cover 300 includes ferrous metal, loss of a vibration may occur due to a magnetic field of the vibration generating module 400, and thus, a sound characteristic of the vibration generating module 400 may be reduced. For example, the low-pitched sound band may be 200 Hz or less, but embodiments of the present disclosure are not limited thereto.

The rear cover 300 according to an embodiment of the present disclosure may further include a rear portion 310 which is configured to support the rear surface of the display module 100, and a side portion 330 which is connected to a periphery region EA of the rear portion 310 to support the supporting part 200.

The rear portion 310 may cover the rear surface of the display module 100 and may support the display module 100. The rear portion 310 may have a plate structure, support the backlight 130 of the display module 100, and support the vibration generating module 400. For example, the rear portion 310 may directly contact a rear surface of the reflective sheet 133 and may transfer a sound vibration, generated based on a vibration of the vibration generating module 400, to the reflective sheet 133 of the backlight 130.

The rear portion 310 may include a middle region MA corresponding to (or overlapping) a middle portion of the display module 100 and a periphery region EA corresponding to (or overlapping) the periphery region of the display module 100.

The side portion 330 may be bent from a periphery of the rear portion 310 and may be configured to support the supporting part 200. The side portion 330 may provide a backlight accommodating space on the rear portion 310 and may surround side surfaces of the backlight 130 accommodated into (or supported by) the backlight accommodating space. The side portion 330 may transfer a sound vibration, generated in the rear portion 310 by the vibration generating module 400, to the supporting part 200.

The rear cover 300 according to an embodiment of the present disclosure may further include a reinforcement portion 350. The reinforcement portion 350 may reinforce a stiffness of the rear cover 300 and thus may be referred to as a stiffness reinforcement portion, but embodiments of the present disclosure are not limited thereto.

The reinforcement portion 350 may be disposed in a region (or a connection region) where the rear portion 310 intersects the side portion 330. For example, the reinforcement portion 350 may be provided along the periphery region EA of the rear portion 310. For example, the reinforcement portion 350 may protrude toward a rear direction to have an inclined surface inclined from an end portion of the rear portion 310. When the rear cover 300 includes the reinforcement portion 350, the side portion 330 may be connected to the end portion of the reinforcement portion 350.

The display apparatus according to an embodiment of the present disclosure may further include a system rear cover 600 on a rear surface of the rear cover 300.

The system rear cover 600 may accommodate the display module 100 in which the vibration generating module 400 is disposed, and may surround the side surfaces of the display module 100. For example, the system rear cover 600 may be referred to as a set cover, a rear set cover, an outermost set cover, a product cover, or an outermost product cover, but embodiments of the present disclosure are not limited thereto.

A rear surface (or a backside surface) of a display module 100 may include a middle region MA and a periphery region EA. For example, the rear surface (or the backside surface) of the display module 100 may be divided into the middle region MA and the periphery region EA. The vibration generating module 400 may be disposed in the periphery region EA of the display module 100.

The vibration generating module 400 may include a first sound generating device 410 and a second sound generating device 430. The first sound generating device 410 and the second sound generating device 430 according to an embodiment of the present disclosure may be disposed in the periphery region EA of the rear cover 300. For example, the first sound generating device 410 and the second sound generating device 430 may be disposed along the periphery region EA of the rear cover 300. For example, positions of the first and second sound generating devices 410 and 430 may be disposed to be symmetrical or asymmetrical with a center of the display module 100 with respect to a first direction X (or a widthwise direction) of the display module 100.

The display panel 110 according to an embodiment of the present disclosure may include a first substrate 111, a second substrate 113, a second polarization member 115, and a first polarization member 117.

The first substrate 111 may be an upper substrate or a thin film transistor (TFT) array substrate and may include a pixel array (or display portion or display region) including a plurality of pixels respectively in a plurality of pixel areas by intersections of a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111 may further include a pad part in a first periphery (or a first non-display portion) thereof and a gate driving circuit in a second periphery (or a second non-display portion) thereof.

The pad part may provide the pixel array and/or the gate driving circuit with a signal supplied from the outside. For example, the pad part may include a plurality of data pads connected to the plurality of data lines through a plurality of data link lines and a plurality of gate input pads connected to the gate driving circuit via a gate control signal line. A first periphery of the first substrate 111 including the pad part may protrude from a corresponding side surface of the first periphery of the second substrate 113, and the pad part may be exposed in a rearward direction toward the rear cover 300. For example, the first substrate 111 may have a size which is greater than that of the second substrate 113, but embodiments of the present disclosure are not limited thereto.

The gate driving circuit according to an embodiment of the present disclosure may be embedded (or integrated) into the second periphery of the first substrate 111 so as to be connected to the plurality of gate lines. For example, the gate driving circuit may be a shift register including a transistor which is formed through the same process as a process of forming a TFT in each of the pixel areas. As another example, the gate driving circuit may be configured in the form of an integrated circuit without being embedded into the first substrate 111 and may be included in the panel driving circuit.

The second substrate 113 may be a lower substrate or a color filter array substrate and may include a pixel pattern which includes an opening area overlapping each of the pixel areas on the first substrate 111 and a color filter layer in the opening area. The second substrate 113 according to an embodiment of the present disclosure may have a size which is less than that of the first substrate 111, but embodiments of the present disclosure are not limited thereto. For example, the second substrate 113 may overlap a portion other than the first periphery of the first substrate 111. The second substrate 113 may be attached to the portion other than the first periphery of the first substrate 111 with a liquid crystal layer therebetween using a sealant.

The liquid crystal layer may be between the first substrate 111 and the second substrate 113 and may include a liquid crystal including liquid crystal molecules having an alignment direction which is changed based on an electric field generated from the common voltage and a data voltage applied to the pixel electrode in each of the plurality of pixels.

The second polarization member 115 may be on a lower surface of the second substrate 113 and may polarize light which is irradiated from the backlight 130 and travels to the liquid crystal layer.

The first polarization member 117 may be on an upper surface of the first substrate 111 and may polarize light which passes through the first substrate 111 and is output to the outside.

The display panel 110 according to an embodiment of the present disclosure may drive the liquid crystal layer according to the electric field generated from the common voltage and the data voltage applied to the pixel electrode in each of the plurality of pixels, thereby displaying an image by using light passing through the liquid crystal layer.

Because the first substrate 111 which is the TFT array substrate configures an image display surface, a whole front surface of the display panel 110 according to an embodiment may be externally exposed without being covered by a separate mechanism.

According to another embodiment of the present disclosure, in the display panel 110, the first substrate 111 may be the color filter array substrate, and the second substrate 113 may be the TFT array substrate. For example, the display panel 110 according to another embodiment of the present disclosure may have a type where an upper portion and a lower portion of the display panel 110 according to an embodiment of the present disclosure are reversed therebetween. For example, a pad part of the display panel 110 according to another embodiment of the present disclosure may be covered by a separate mechanism or structure.

The display module 100 according to an embodiment of the present disclosure may further include a buffer member 150. The buffer member 150 may surround side surfaces of the display panel 110. The buffer member 150 may cover each side surface and each corner of the display panel 110. The buffer member 150 may protect the side surfaces of the display panel 110 from an external impact, or may prevent light from being leaked through the side surfaces of the display panel 110. The buffer member 150 may include a silicon-based sealant or ultraviolet (UV)-curable sealant (or resin), but considering a process tact time, the buffer member 150 may include the UV-curable sealant. Also, the buffer member 150 may have color (for example, blue, red, bluish green, or black), but embodiments of the present disclosure are not limited thereto. For example, the buffer member 150 may include a colored resin or a light blocking resin for preventing leakage of light through a side surface.

A portion of an upper surface of the buffer member 150 according to an embodiment of present disclosure may be covered by the first polarization member 117. For example, the first polarization member 117 may include an extension portion which extends long from a side surface corresponding to an outer surface of the first substrate 111 to cover a portion of a front surface of the buffer member 150 and is attached on a portion of the front surface of the buffer member 150. A bonding or attaching surface (or a boundary portion between the buffer member 150 and the first substrate 111) between the buffer member 150 and the first substrate 111 may be concealed by the extension portion of the first polarization member 117 and may not be exposed at a forward region, at which a viewer is located, in front of the display apparatus. In a case where the buffer member 150 is not provided, the front surface of the display panel 110 may be exposed at the forward region FD in front of the display apparatus without being by a separate mechanism, and leakage of light through the side surfaces of the display panel 110 may occur. Accordingly, to remove or minimize a bezel width of the display apparatus, in the display apparatus having a structure where the whole front surface of the display panel 110 is exposed at the forward region FD, the buffer member 150 may be provided for preventing light from being leaked through the side surface of the display panel 110 and protecting the side surface of the display panel 110. But embodiments of the present disclosure are not limited thereto, and the buffer member 150 may be omitted.

The backlight 130 may be on a rear surface of the display panel 110 and may irradiate light onto the rear surface of the display panel 110. The backlight 130 according to an embodiment of the present disclosure may include a light guide part 131, a light source part, a reflective sheet 133, and an optical sheet part 135.

The light guide part 131 may include a light incident surface which is disposed on the rear cover 300 to overlap the display panel 110 and is provided on at least one sidewall thereof. The light guide part 131 may include a light-transmitting plastic or glass material. The light guide part 131 may transfer (or output) light, which is incident through the light incident surface from the light source unit, to the display panel 110. For example, the light guide part 131 may be referred to as a light guide member or a flat light source, but embodiments of the present disclosure are not limited thereto.

The light source part may irradiate light onto the light incident surface in the light guide part 131. The light source part may be disposed on the rear cover 300 to overlap a first periphery of the display panel 110. The light source part according to an embodiment of the present disclosure may include a plurality of light emitting diode (LED) devices which are mounted on a light source printed circuit board (PCB) and irradiate lights onto the light incident surface of the light guide part 131.

The reflective sheet 133 may be disposed on the rear cover 300 to be covered a rear surface 300 of the light guide part 131. The reflective sheet 133 may reflect light, which is incident from the light guide part 131, toward the light guide part 131 to minimize or reduce the loss of the light.

The optical sheet part 135 may be disposed on a front surface of the light guide part 131 and may enhance a luminance characteristic of light output from the light guide part 131. The optical sheet part 135 according to an embodiment of the present disclosure may include a second diffusive sheet, a second prism sheet, and a first prism sheet. For example, the optical sheet part 135 may be configured a single layer including the second diffusive sheet, the second prism sheet, and the first prism sheet, but embodiments of the present disclosure are not limited thereto. For example, the optical sheet part 135 may be configured by a stacked combination of one or more sheets among a diffusive sheet, a prism sheet, a dual brightness enhancement film (DBEF), and a lenticular sheet, or may be configured with one composite sheet having a light diffusing function and a light collecting function.

The supporting part 200 may support a rear periphery region EA of the display panel 110. The supporting part 200 may be supported by or accommodated into the rear cover 300 to overlap a rear periphery region EA of the display panel 110. The supporting part 200 may be disposed under the rear periphery region EA of the display panel 110 not to protrude to the outside of each side surface of the display panel 110.

The supporting part 200 may include a supporting portion 210 and a guide sidewall 230. For example, the supporting part 200 may have a cross-sectional structure having a ¬-shape or a ⌈-shape, based on a coupling or connection structure of the supporting portion 210 and the guide sidewall 230.

The supporting portion 210 may be coupled or connected to the rear periphery region EA of the display panel 110 and may be supported by the rear cover 300. For example, the supporting portion 210 may have a tetragonal band (or belt) shape including an opening portion overlapping the middle region MA, other than the rear periphery region EA, of the display panel 110, but embodiments of the present disclosure are not limited thereto. The supporting portion 210 may have a size equal to or less than that of the display panel 110 not to protrude to the outside of each side surface of the display panel 110. For example, the opening portion of the supporting portion 210 may have a size which is equal to or greater than that of a pixel array (or a display portion) in the display panel 110.

The supporting portion 210 may directly contact an uppermost surface of the backlight 130 (for example, an uppermost surface of the optical sheet part 135), or may be spaced apart from the uppermost surface of the optical sheet part 135 by a certain distance.

The guide sidewall 230 may be connected to the supporting portion 210 and may surround side surfaces of the rear cover 300. For example, the guide sidewall 230 may be bent from the supporting portion 210 to the side surfaces of the rear cover 300 and may surround the side surfaces of the rear cover 300 or may be surround by the side surfaces of the rear cover 300.

The supporting part 200 according to an embodiment of the present disclosure may include a plastic material, a metal material, or a mixed material of a plastic material and a metal material, but embodiments of the present disclosure are not limited thereto. For example, the supporting part 200 may act as a vibration transfer member which transfers a sound vibration, generated by the vibration generating module 400, to the rear periphery region EA of the display panel 110. Therefore, the supporting part 200 may transfer the sound vibration, generated by the vibration generating module 400, to the display panel 110 without being lost in a state of maintaining stiffness of the display panel 110. For example, the supporting part 200 may include a metal material for transferring the sound vibration, generated by the vibration generating module 400, to the display panel 110 without being lost in a state of maintaining stiffness of the display panel 110, but embodiments of the present disclosure are not limited thereto.

The supporting part 200 according to an embodiment of the present disclosure may be coupled or connected to the rear periphery region EA of the display panel 110 by a first connection member 250.

The first connection member 250 may be between the rear periphery region EA of the display panel 110 and the supporting portion 210 of the supporting part 200, and may dispose or couple the display panel 110 on the supporting part 200. The first connection member 250 according to an embodiment of the present disclosure may include an acryl-based adhesive member or a urethane-based adhesive member, but embodiments of the present disclosure are not limited thereto. For example, the first connection member 250 may include the acryl-based adhesive member which is relatively better in adhesive force and hardness so that the vibration of the supporting part 200 can be well transferred to the display panel 110. For example, the first connection member 250 may include a double-sided foam adhesive pad having an acryl-based adhesive layer, or an acryl-based adhesive resin curing layer.

A front surface of the first connection member 250 according to an embodiment of present disclosure may be coupled or connected to the second substrate 113 or the second polarization member 115 of the display panel 110. For example, the first connection member 250 may be directly coupled or connected to a rear periphery region EA of the second substrate 113 to enhance an adhesive force between the first connection member 250 and the display panel 110. For example, the first connection member 250 may be attached on a rear periphery region EA of the second substrate 113, and may surround a side surface of the second polarization member 115, thereby preventing light leakage of the side surface from occurring in the second polarization member 115.

The first connection member 250 may provide a sound transfer space STS between the display panel 110 and the supporting part 200 to have a certain thickness (or height). The first connection member 250 according to an embodiment of the present disclosure may have a four-side-closed shape or a closed loop shape on the supporting portion 210 of the supporting part 200, but embodiments of the present disclosure are not limited thereto. For example, the first connection member 250 may provide the closed sound transfer space STS between a rearmost surface of the display panel 110 and an uppermost surface of the backlight 130 which face each other with the opening portion of the supporting part 200 therebetween, thereby preventing or minimizing the leakage (or loss) of a sound pressure transferred to the sound transfer space STS. The sound transfer space STS may also act as a sound generating space where a sound pressure is generated based on a vibration of the backlight 130 or a panel vibration space which enables a vibration of the display panel 110 to be smoothly performed.

With reference to FIGS. 2 to 6, the vibration generating module 400 may be disposed in the periphery region EA of the rear cover 300. For example, the vibration generating module 400 may be disposed along the periphery region EA of the rear cover 300.

The vibration generating module 400 may be disposed in the rear region of the rear cover 300 and may vibrate a region of the display module 100. For example, the region of the display module 100 may overlap the periphery region EA of the display module 100, the region of the display module 100 may be the periphery region EA of the display module 100.

The vibration generating module 400 according to an embodiment of the present disclosure may be coupled to or disposed on the periphery region EA among the rear portion 310 of the rear cover 300. Therefore, in response to a sound signal (or a voice signal) input from the outside, the vibration generating module 400 may vibrate the periphery region EA of the rear portion 310 to generate a sound pressure and may vibrate the periphery region EA of the display panel 110 with the sound pressure to generate the sound S1. The vibration generating module 400 according to an embodiment of the present disclosure may include a sound actuator or a sound exciter, but embodiments of the present disclosure are not limited thereto. For example, the vibration generating module 400 may be implemented as a sound generating device using a coil (or a voice coil) and a magnet.

FIG. 4 illustrates a sound generating device according to an embodiment of the present disclosure.

The vibration generating module 400 according to an embodiment of the present disclosure may include a first sound generating device 410 and a second sound generating device 430.

With reference to FIGS. 2 to 4, the first and second sound generating parts 410 and 430 according to an embodiment of the present disclosure may each include a module frame 401, a bobbin 402, a magnet member 403, a coil 404, a center pole 405, and a damper 406.

The module frame 401 may be supported by the rear portion 310. The module frame 401 according to an embodiment of the present disclosure may include a frame body 401a, a first plate 401b, and a bracket 401c.

The frame body 401a may be fixed to the rear portion 310, and the frame body 401a may act as a lower plate or a second plate, which may support the magnet member 403.

The first plate 401b may be disposed to a periphery of a front surface the frame body 401a to have a cylindrical shape including a hollow portion. The frame body 401a and the first plate 401b may be provided as one body having a U-shape. For example, the frame body 401a and the first plate 401b are not limited to these terms, and may be referred to as a yoke, etc.

The bracket or fixing bracket 401c may protrude from a side surface of the upper plate 401b. The bracket 401c may be fixed to the rear portion 310 by a module connection member, and through this, the module frame 401 may be fixed to the rear portion 310.

The module connection member according to an embodiment of the present disclosure may be a screw or a bolt, which may pass through the bracket 401c, and may be coupled to the rear portion 310 of the rear cover 300. For example, a buffer ring may be between the rear portion 310 of the rear cover 300 and the bracket 401c, and the buffer ring may prevent a vibration of the rear portion 310 from being transferred to the module frame 401.

The module connection member according to an embodiment of the present disclosure may fix a bracket 401c or a module frame 401 to the rear portion 310. For example, the module connection member may include an adhesive member disposed between the bracket 401c and the rear portion 310. For example, the adhesive member may include a single-sided tape, a single-sided adhesive pad, a single-sided adhesive gap pad, a single-sided adhesive foam pad, a double-sided tape, a double-sided adhesive pad, a double-sided adhesive gap pad, or a double-sided adhesive foam pad, but embodiments of the present disclosure are not limited thereto.

The bobbin 402 may be on the module frame 401 and may vibrate the rear portion 310 of the rear cover 300. The bobbin 402 according to an embodiment of the present disclosure may have a cylindrical shape including the hollow portion 402a and may be coupled to a rear surface of the rear portion 310. For example, the bobbin 402 may have a ring structure, which may be formed of a material produced by processing pulp or paper, Al or Mg or an alloy thereof, synthetic resin such as polypropylene, or a polyamide-based fiber, but embodiments of the present disclosure are not limited thereto. The bobbin 402 may vibrate based on a magnetic force, and for example, may perform a vertical reciprocating motion, thereby vibrating the rear cover 300.

The bobbin 402 according to an embodiment of the present disclosure may have a circular shape or an elliptical (or oval shape), but embodiments of the present disclosure are not limited thereto. The bobbin 402 having the oval shape may have an elliptical shape, a corners-rounded rectangular shape, or a non-circular curved shape having a width different from its height, but embodiments of the present disclosure are not limited thereto. For example, in the bobbin 402 having the oval shape, a ratio of a long-axis diameter and a short-axis diameter may be 1.3:1 to 2:1. The bobbin 402 having the oval shape may more improve a sound of the high-pitched sound band than the circular shape and may reduce heat caused by a vibration, and thus, the bobbin 402 having the oval shape may have a good heat dissipation characteristic.

The magnet member 403 may be provided on the module frame 401 to be accommodated into the hollow portion 402a of the bobbin 402. The magnet member 403 may be a permanent magnet having a cylindrical shape to be accommodated into the hollow portion 402a of the bobbin 402. The magnet member 403 according to an embodiment of the present disclosure may be implemented with a sintered magnet, such as barium ferrite, and a material of the magnet member 403 may include one or more of: ferric oxide ($Fe_2O_3$); barium carbonate (or witherite) ($BaCO_3$); neodymium (Nd); strontium ferrite ($Fe_{12}O_{19}Sr$) with an improved magnet component; and an alloy cast magnet including aluminum (Al), nickel (Ni), cobalt (Co), and/or the like, but embodiments of the present disclosure are not limited thereto. For example, the neodymium magnet may be neodymium-iron-boron (Nd—Fe—B), but embodiments of the present disclosure are not limited thereto.

The coil 404 may be wound to surround an outer circumference surface of the bobbin 402 and may be supplied with a sound signal (or a voice signal) from the outside. The coil 404 may be raised or lowered along with the bobbin 402. When a sound signal (or a current) is applied to the coil 404, a whole portion of the bobbin 402 may vibrate, for example, may perform a vertical reciprocating motion, according to Fleming's left hand rule based on an application magnetic field generated around the coil 404 and an external magnetic field generated around the magnet member 403. For example, the coil 404 may be referred to as a voice coil, but embodiments of the present disclosure are not limited thereto.

The center pole 405 may be on the magnet member 403, and may guide a vibration of the bobbin 402. For example, the center pole 405 may be inserted or accommodated into the hollow portion of the bobbin 402, and may be surrounded by the bobbin 402. For example, the center pole 405 may be referred to as an "elevation guider" or "pole pieces," but embodiments of the present disclosure are not limited thereto.

The damper 406 may be between the module frame 401 and the bobbin 402. For example, the damper 406 may be between the frame body 401a of the module frame 401 and an upper outer circumference surface of the bobbin 402. The damper 406 may be provided in a creased structure that may be creased between one end and the other end thereof and may be contracted and relaxed based on a vibration of the bobbin 402. A vibration distance (or a vertical movement distance) of the bobbin 402 may be limited by a restoring force of the damper 406. As one example, when the bobbin 402 vibrates by a certain distance or more or vibrates by a certain distance or less, the bobbin 402 may be restored to an original position by the restoring force of the damper 406. For example, the damper 406 may be referred to as a "spider," a "suspension," or an "edge," but embodiments of the present disclosure are not limited thereto.

Each of the first and second sound generating devices 410 and 430 according to an embodiment of the present disclosure may be referred to as an internal magnetic type (or a micro type) such that the magnet member 403 may be inserted into the hollow portion 402a of the bobbin 402.

Each of the first and second sound generating devices 410 and 430 according to another embodiment of the present disclosure may be referred to as an external magnetic type (or a dynamic type) such that the magnet member 403 is disposed to surround an outer portion of the bobbin 402. For example, except for that the magnet member 403 may be provided between the frame body 401a and the first plate 401b, and the center pole 405 may be provided on the second plate (such as the frame body 401a) to be inserted or accommodated into the hollow portion of the bobbin 402, the external magnetic type sound generating devices 410 and 430 may be substantially similar to the internal magnetic type. Thus, detailed descriptions are omitted.

Each of the first and second sound generating devices 410 and 430 according to an embodiment of the present disclosure may further include a bobbin protection member 407 between an upper portion of the bobbin 402 and the rear portion 310 of the rear cover 300.

The bobbin protection member 407 may be provided in a cylindrical structure including an opening overlapping the hollow portion 402a of the bobbin 402 and may be disposed or coupled to an upper surface of the bobbin 402. The bobbin protection member 407 may cover the upper surface of the bobbin 402 to protect the bobbin 402, thereby preventing deformation of the bobbin 402 caused by an external impact.

The bobbin protection member 407 according to an embodiment of the present disclosure may be provided in a molding form of an injection material or a mold product of metal. For example, the bobbin protection member 407 may include a textile reinforced material, a composite resin including a textile reinforced material, or metal, and for example, may have a heat dissipation function of dissipating heat occurring when the first and second sound generating devices 410 and 430 are being driven. The textile reinforced material may be one of carbon fiber reinforced plastics (CFRP), glass fiber reinforced plastics (GFRP), and graphite fiber reinforced plastics (GFRP), or a combination thereof, but embodiments of the present disclosure are not limited thereto.

The bobbin protection member 407 may be coupled or connected to the bobbin 402 by a double-sided tape or an adhesive resin. For example, the adhesive resin may be an epoxy resin or an acryl resin, but embodiments of the present disclosure are not limited thereto.

The bobbin protection member 407 may be coupled or connected to the rear portion 310 of the rear cover 300 by a double-sided tape or an adhesive resin.

With reference to FIG. 6, a display module 100 according to an embodiment of the present disclosure may include a display panel 110 and a backlight 130.

The display panel 110 may be configured to display an image using light irradiated from the backlight 130. The display panel 110 may act as a vibration plate which vibrates based on a vibration of the vibration generating module 400 to output sound S1 to a forward region FD in front of the display panel 110. For example, the display panel 110 may output the sound S1 according to the vibration of the vibration generating module 400.

The first sound generating device 410 may vibrate a first periphery region EA1 (or a left periphery region) of the periphery region EA of the display module 100 to output a sound S1 to the forward region FD in front of the display panel 110. For example, when the first sound generating device 410 vibrates based on a sound signal, the first periphery region EA1 (or a first rear region) of the rear portion 310 may vibrate based on the vibration of the first sound generating device 410 to generate a sound pressure in a gap space GS (or a sound outputting space) between the first sound generating device 410 and the rear cover 300, thereby vibrating the first periphery region EA1 of the display module 100 to generate the sound S1. For example, when the first sound generating device 410 vibrates according to the sound signal, the first periphery region EA1 of the rear portion 310 may vibrate based on the vibration of the first sound generating device 410 to generate a sound pressure in the gap space GS, the backlight 130 may vibrate based on the generated sound pressure to generate a sound pressure in the sound transfer space STS, and the display panel 110 may vibrate based on the sound pressure transferred to the sound transfer space STS to generate the sound S1, thereby outputting the sound S1 to the forward region FD in front of the display panel 110. Accordingly, the sound wave (or sound pressure) generated based on the vibration of the first sound generating device 410 may be directly transferred (or propagated) to the display module 100, thereby enhancing the sound pressure characteristic and sound quality of the sound S1.

The second sound generating device 430 may vibrate a second periphery region EA2 (or a right periphery region) of the periphery region EA of the display module 100 to output a sound S1 to the forward region FD in front of the display panel 110. For example, when the second sound generating device 430 vibrates based on a sound signal, the second periphery region EA2 (or a second rear region) of the rear portion 310 may vibrate based on the vibration of the second sound generating device 430 to generate a sound pressure in a gap space GS (or a sound outputting space) between the second sound generating device 410 and the rear cover 300, thereby vibrating the second periphery region EA2 of the display module 100 to generate the sound S1. For example, when the second sound generating device 430 vibrates according to the sound signal, the second periphery region EA2 of the rear portion 310 may vibrate based on the vibration of the second sound generating device 430 to generate a sound pressure in the gap space GS, the backlight 130 may vibrate based on the generated sound pressure to generate a sound pressure in the sound transfer space STS, and the display panel 110 may vibrate based on the sound pressure transferred to the sound transfer space STS to generate the sound S1, thereby outputting the sound S1 to the forward region FD in front of the display panel 110. Accordingly, the sound wave (or sound pressure) generated based on the vibration of the second sound generating device 430 may be directly transferred (or propagated) to the display module 100, thereby enhancing the sound pressure characteristic and sound quality of the sound S1.

With reference to FIGS. 3 to 6, the first sound generating device 410 and the second sound generating device 430 according to an embodiment of the present disclosure may be disposed at a rear periphery of the rear cover 300. For example, the first sound generating device 410 and the second sound generating device 430 may be disposed apart from a rear surface of the rear cover 300. For example, the first sound generating device 410 and the second sound generating device 430 may be disposed at the rear cover 300 by a second connection member 800. For example, the second connection member 800 may be disposed between the first sound generating device 410 and the rear cover 300, and disposed between the second sound generating device 430 and the rear cover 300.

The second connection member 800 may be implemented to include an opening portion or an open region, for solving a problem where sounds generated by the first sound generating device 410 and the second sound generating device 430 are blocked between each of the first sound generating device 410 and the second sound generating device 430 and the rear cover 300. For example, the second connection member 800 may include an opening portion or an open region, which is provided at a side surface thereof. For example, the second connection member 800 may have a structure where the side surface thereof is open. For example, one side surface of the second connection member 800 may be open. For example, the sounds of the first sound generating device 410 and the second sound generating device 430 may be output to a lateral region (or lateral direction) in side of the rear cover 300 through the one side surface of the second connection member 800. Accordingly, the first sound generating device 410 and the second sound generating device 430 may be disposed at the rear cover 300, and the sounds of the first sound generating device 410 and the second sound generating device 430 may be output to a rearward region (or a rearward direction) in rear and a lateral region in side of the rear cover 300.

With reference to FIG. 6, the sounds of the first sound generating device 410 and the second sound generating device 430 may be output in the rearward direction and the lateral direction of the rear cover 300 by the second connection member 800 including the opening portion or the open region. Therefore, a path of the sounds generated by the first sound generating device 410 and the second sound generating device 430 may be a first sound path SP1. For example, when the first sound generating device 410 and the second sound generating device 430 are provided, a problem where a sound of a high-pitched sound band is not output due to a sound output through or via the first sound path SP1 may be solved.

With reference to FIGS. 4 to 6, the vibration generating module 400 according to an embodiment of the present disclosure may further include a first hole 409. The first hole 409 may prevent dust or particles from flowing into the vibration generating module 400 due to the second connection member 800 including the opening portion or the open region. For example, the first hole 409 may include a plurality of holes which communicate with a space between the periphery of the rear cover 300 and the first and second sound generating devices 410 and 430. The first hole 409 may have a mesh structure, but embodiments of the present disclosure are not limited thereto. For example, the first hole 409 may be disposed at a cover 408 disposed near the bracket 401c. The cover 408 may be implemented independently from the bracket 401c, but embodiments of the present disclosure are not limited thereto. For example, the cover 408 may be provided as one body with the bracket 401c. For example, the cover 408 may be implemented to cover or occlude all or a portion of the opening portion (or the open region) of the second connection member 800.

Therefore, in the vibration generating module 400 according to an embodiment of the present disclosure, a connection member which is disposed in the periphery region EA of the rear cover 300 and between the rear cover 300 and the vibration generating module 400 and where one side or one side surface thereof is open may be provided, and thus, a sound may be output in the rearward direction and the lateral direction with respect to the rear cover. For example, in the sound generating devices 410 and 430 according to an embodiment of the present disclosure, a connection member which is disposed in the periphery region EA of the rear cover 300 and between the rear cover 300 and the sound generating devices 410 and 430 and where one side surface thereof is open may be provided, and thus, a sound may be output in the rearward direction and the lateral direction with respect to the rear cover. Accordingly, a display apparatus including a vibration generating module for outputting a sound of the high-pitched sound band may be provided.

Figure 7:
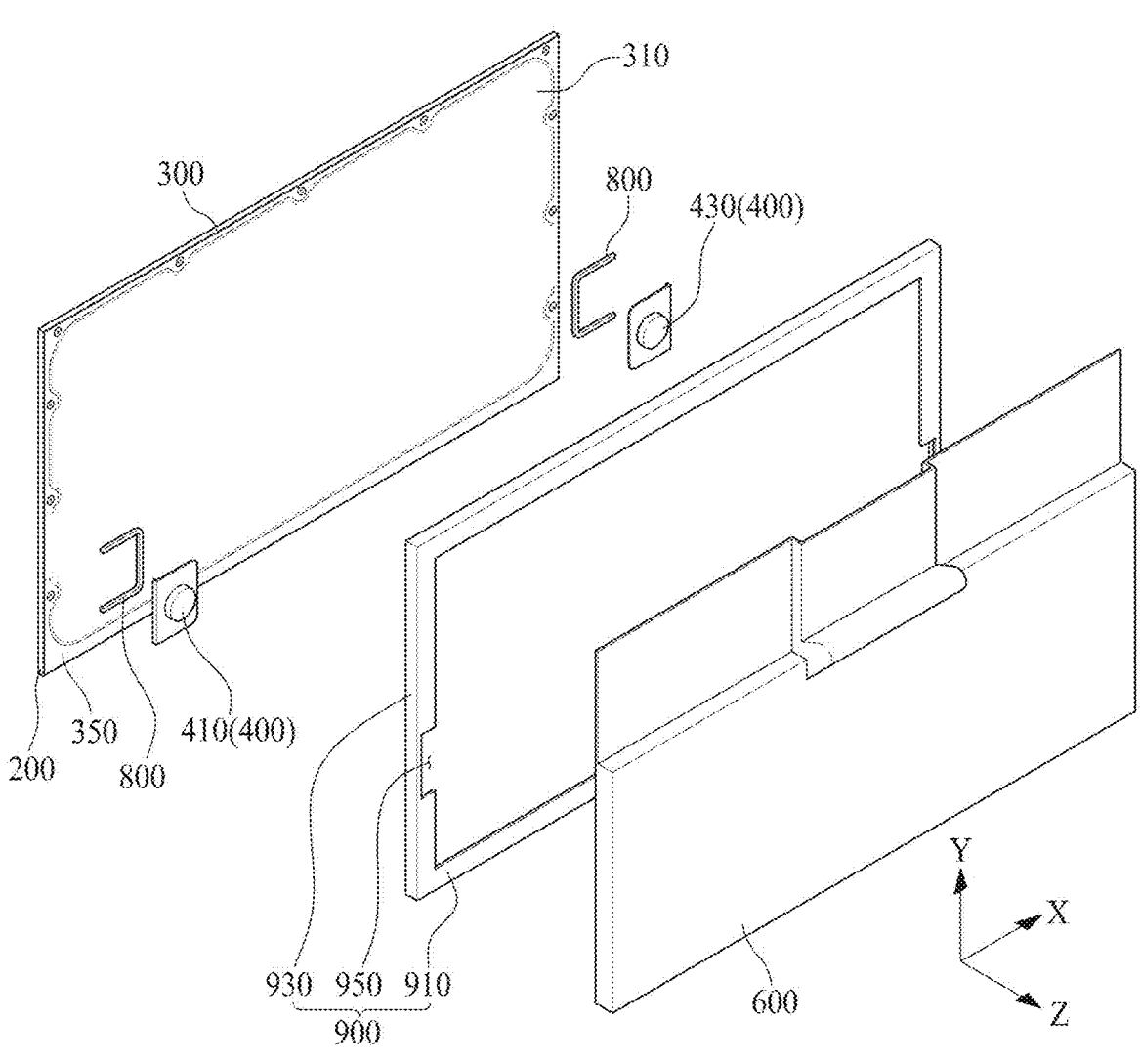
FIG. 7 is an exploded view of a display apparatus according to another embodiment of the present disclosure.
Figure 8:
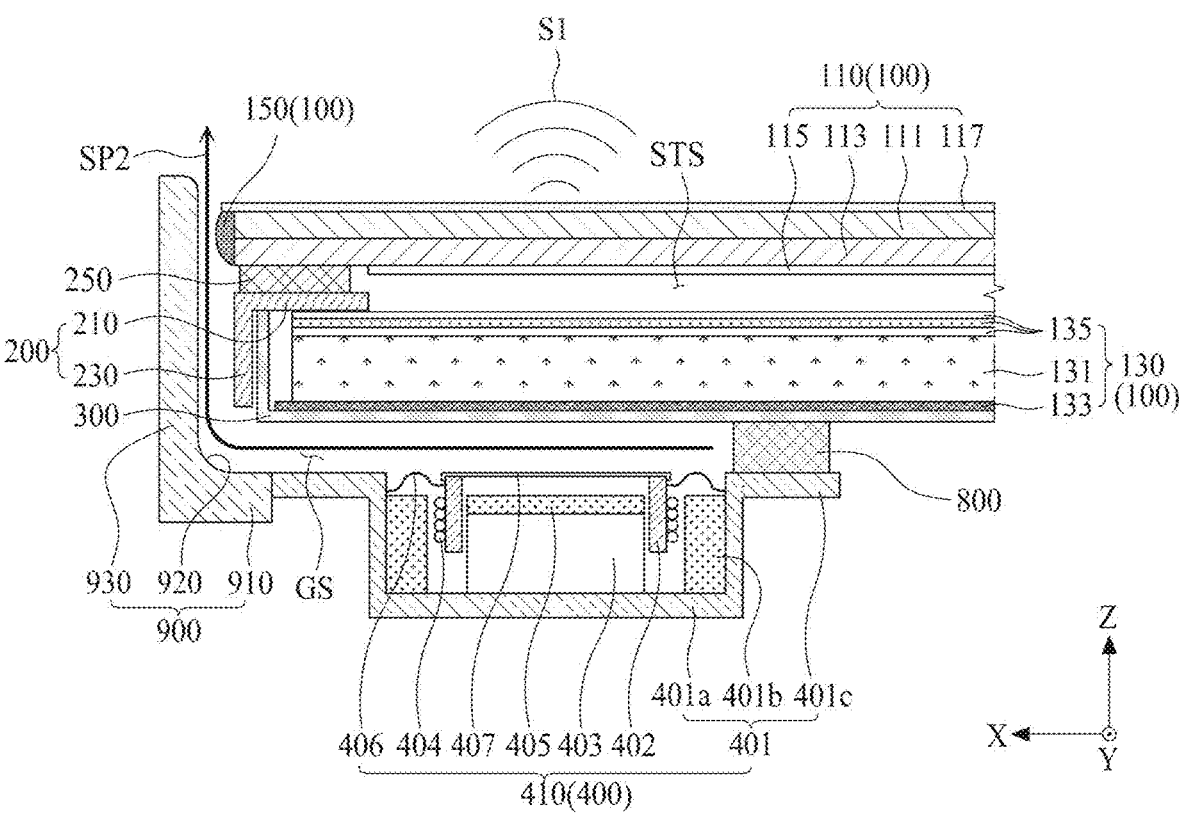
FIG. 8 illustrates a display apparatus according to another embodiment of the present disclosure.

FIG. 7 is an exploded view of a display apparatus according to another embodiment of the present disclosure. FIG. 8 illustrates a display apparatus according to another embodiment of the present disclosure.

With reference to FIGS. 7 and 8, the display apparatus according to another embodiment of the present disclosure may include a display module 100, a supporting part 200, a rear cover 300, a vibration generating module 400, and a structure 900.

The structure 900 according to an embodiment of the present disclosure may be disposed at one side or one portion of the display module 100. For example, since the structure 900 is disposed at the one side or one portion of the display module 100, sounds of first and second sound generating devices 410 and 430 may be reflected by the structure 900 and may be output in a forward direction with respect to the display module 100. For example, the structure 900 may be a sound guide structure which guides a sound of the vibration generating module 400 so as to be output in the forward direction or a lateral direction of the display module 100. For example, the structure 900 and/or a connection member where one side or one side surface thereof is open may be a sound guide structure which guides a sound of the vibration generating module 400 so as to be output in the forward direction or the lateral direction of the display module 100. A sound of the vibration generating module 400 may be reflected by a side surface of the structure 900 and may be output in the forward direction of the display module 100, thereby providing a display apparatus for outputting a sound of the high-pitched sound band.

For example, the structure 900 may include a bottom portion 910, a sound guide portion 920, a side portion 930, and a groove portion 950. The groove portion 950 may be a portion at which the vibration generating module 400 is disposed and may be disposed at one side (or portion) of the bottom portion 910. The bottom portion 910 may be disposed at a rear surface of the rear cover 300. The side portion 930 may be spaced apart from one side surface or one portion of the display module 100 and may be connected to the bottom portion 910. The sound guide portion 920 may be disposed between the bottom portion 910 and the side portion 930 and may be a corner portion between an inner surface of the side portion 930 and the bottom portion 910. For example, the sound guide portion 920 may allow the sound of the vibration generating module 400 to be reflected by the sound guide portion 920 and output in a forward direction of the display module 100. Therefore, the sound of the vibration generating module 400 may be structured to be reflected by the structure 900 and output in the forward direction of the display module 100. For example, the sounds of the first and second sound generating devices 410 and 430 may be structured to be reflected by the structure 900 and output in the forward direction of the display module 100. For example, the sound guide portion 920 may be implemented in a curve shape or a corner-rounded shape. For example, when the sound guide portion 920 has a curve shape or a corner-rounded shape, reflection of a sound traveling in a gap space GS (or a sound outputting space) between the vibration generating module 400 and the rear cover 300 may be more enhanced. For example, a path of a sound generated by the vibration generating module 400 may be a second sound path SP2. For example, a path of each of the sounds generated by the first sound generating device 410 and the second sound generating device 430 may be the second sound path SP2. For example, the second sound path SP2 may include a forward direction and a lateral direction of the display module 100. For example, the second sound path SP2 may include a forward direction (or a thickness direction of the display module) and a lateral direction in which a sound travels in the gap space GS (or the sound outputting space) between the vibration generating module 400 and the rear cover 300. For example, the second sound path SP2 may include a forward direction and a lateral direction in which a sound is reflected from the gap space GS (or the sound outputting space) between the vibration generating module 400 and the rear cover 300, and for example, may include a forward direction and a lateral direction in which a sound is output through or via the second connection member 800.

Figure 9:
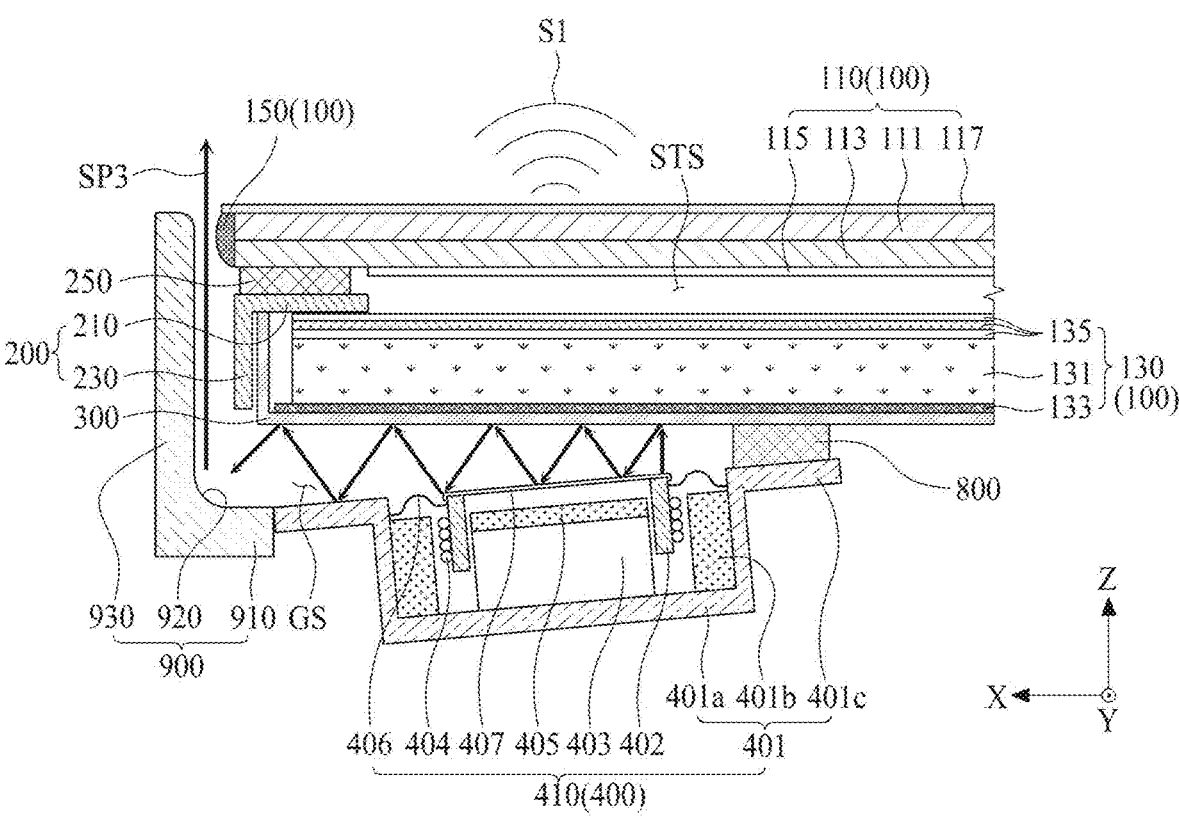
FIG. 9 illustrates a display apparatus according to another embodiment of the present disclosure.

FIG. 9 illustrates a display apparatus according to another embodiment of the present disclosure. Even if it is not illustrated additionally the rear surface of the rear cover or the rear cover itself could be also inclined.

With reference to FIG. 9, a vibration generating module 400 may be disposed to be inclined with respect to a rear surface of a rear cover 300. For example, the vibration generating module 400 may be disposed to be inclined by a second connection member 800 whose one side (or portion) is open. For example, the vibration generating module 400 may be inclined by a height of the second connection member 800. For example, the second connection member 800 may have a height which is progressively reduced from one portion thereof to the other portion opposite to the one portion. For example, the second connection member 800 may include a first side parallel to the one portion thereof, a second side connected to one end (or portion) of the first side, and a third side connected to the other end (or portion) of the first side in parallel with the second side, and a height of each of the second side and the third side may have a lower height (a thickness) as it nears the first side.

For example, a degree to which the vibration generating module 400 is inclined may vary from one side (or portion) of the rear cover 300 to the other side (or portion) thereof so that a sound output at a side surface of the display module 100 is enhanced. For example, when a side (or portion) at which the second connection member 800 is disposed is the one side (or portion) of the rear cover 300, a degree to which the vibration generating module 400 is inclined may increase from the one side (or portion) of the rear cover 300 to the other side (or portion) thereof. Therefore, a sound of the vibration generating module 400 may be efficiently output at the other side (or portion) of the second connection member 800 whose the one side (or portion) is open. For example, the sound of the vibration generating module 400 may be reflected between the vibration generating module 400 and a rear surface of the rear cover 300 and may be output in the forward direction of the display module 100. For example, the sound of the vibration generating module 400 may be reflected by a side surface of the structure 900 and may be output in the forward direction of the display module 100. For example, the inclined vibration generating module 400 and the second connection member 800 whose the one side (or portion) or the one side surface is open may include a sound guide structure which guides the sound of the vibration generating module 400 so to be output in the forward direction or a lateral direction of the display module 100. For example, the inclined vibration generating module 400 and the second connection member 800, whose the one side (or portion) or the one side surface is open, and/or the structure 900 may include a sound guide structure which guides the sound of the vibration generating module 400 so to be output in the forward direction or the lateral direction of the display module 100. Accordingly, since a connection member whose one side or one side surface is open is provided, the sound of the vibration generating module 400 may be output in the lateral direction, a region where a sound between the rear cover 300 and the vibration generating module 400 is reflected may be increased by the inclined vibration generating module 400, and a sound may be reflected by a side surface of the structure 900 and may be output in the forward direction of the display module 100, thereby more enhancing a sound characteristic of the high-pitched sound band.

For example, a path of a sound generated by the vibration generating module 400 may be a third sound path SP3. For example, a path of the sounds generated by the first sound generating device 410 and the second sound generating device 430 may be the third sound path SP3. For example, the third sound path SP3 may be a forward direction (or a thickness direction of the display module) and a lateral direction in which a sound is reflected by a rear surface of the display module 100. For example, the third sound path SP3 may be a forward direction and a lateral direction in which a sound is reflected from the gap space GS (or the sound outputting space) between the vibration generating module 400 and the rear cover 300, and may be a forward direction and a lateral direction in which a sound is output through the second connection member 800. For example, the third sound path SP3 may be a forward direction and a lateral direction in which a sound is reflected from the gap space GS (or the sound outputting space) between the vibration generating module 400 and the rear cover 300, and may be a forward direction in which a sound is reflected by the side surface of the structure 900. Accordingly, a display apparatus for more enhancing a sound of the high-pitched sound band may be provided.

Figure 10:
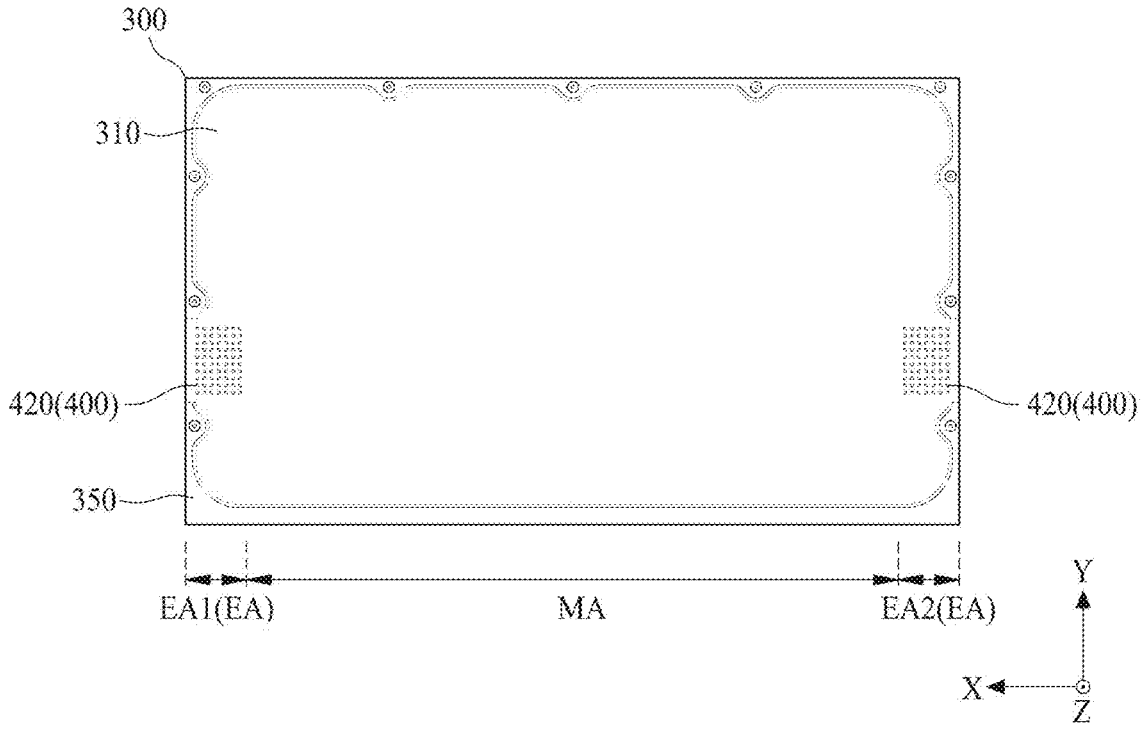
FIG. 10 illustrates a rear surface of a display apparatus according to another embodiment of the present disclosure.
Figure 11:
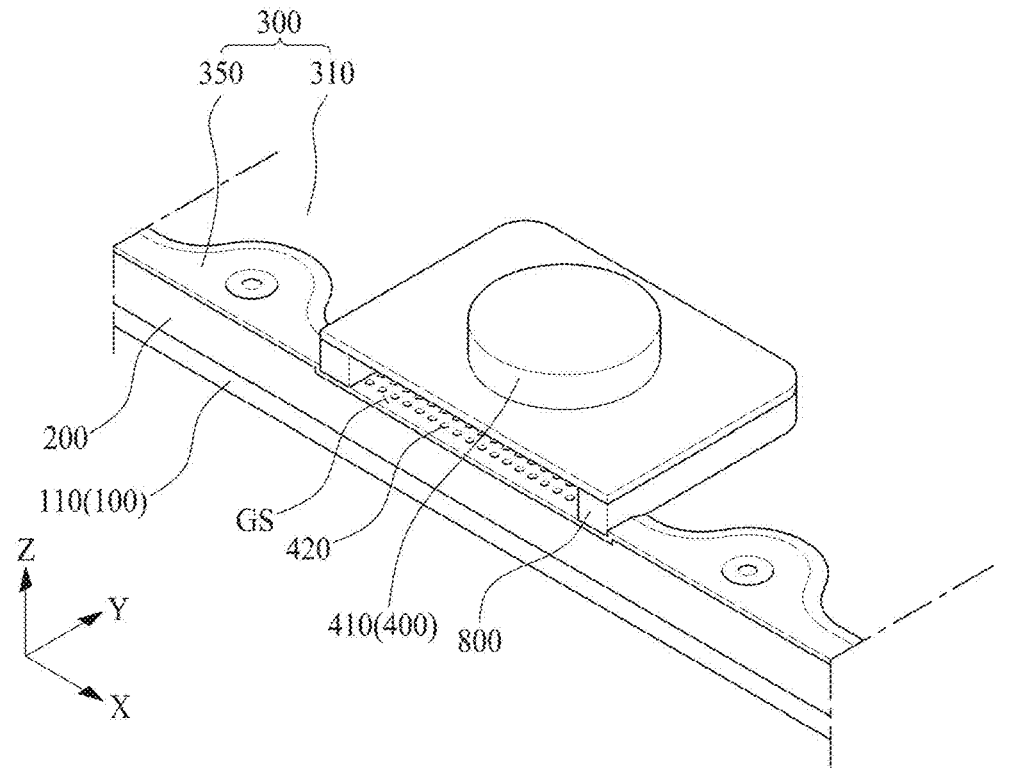
FIG. 11 is a view from above of a display apparatus according to another embodiment of the present disclosure.
Figure 12:
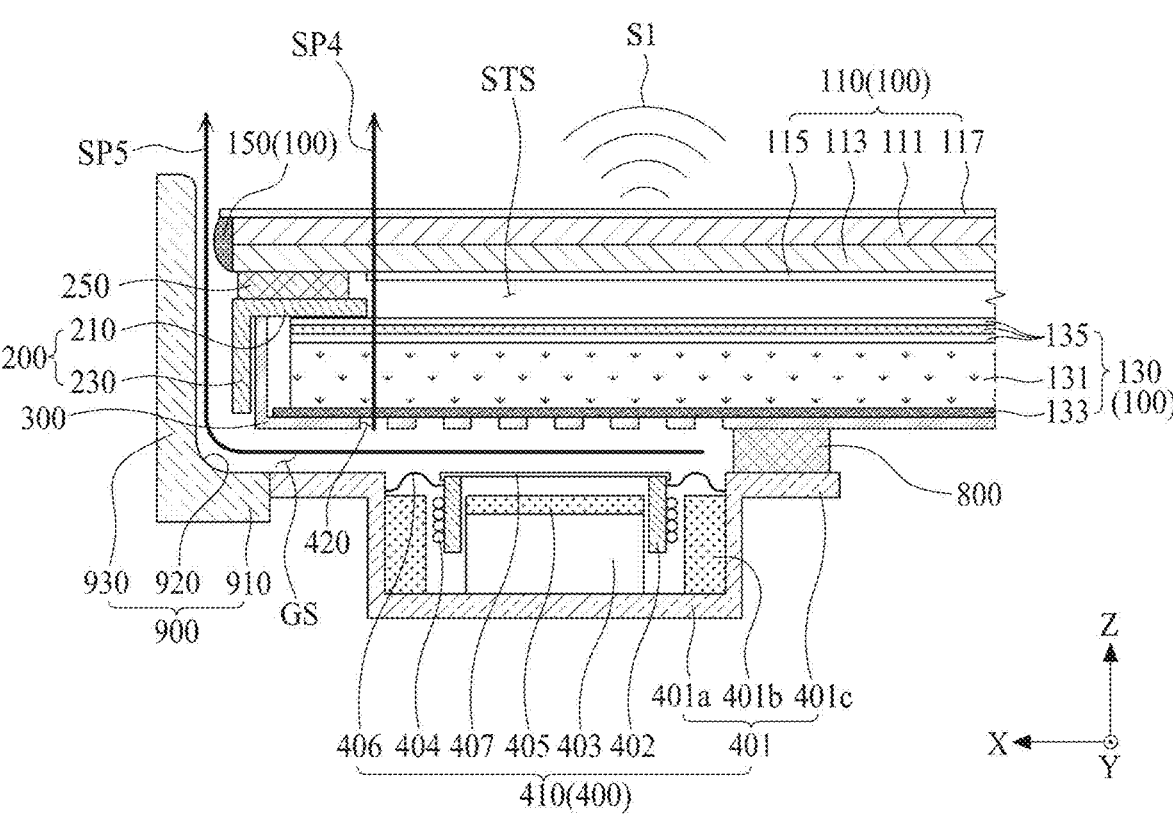
FIG. 12 illustrates a display apparatus according to another embodiment of the present disclosure.

FIG. 10 illustrates a rear surface of a display apparatus according to another embodiment of the present disclosure. FIG. 11 is a view from above of a display apparatus according to another embodiment of the present disclosure. FIG. 12 illustrates a display apparatus according to another embodiment of the present disclosure. FIGS. 10 to 12 illustrate an embodiment of the present disclosure implemented by modifying a structure of a rear cover in the display apparatus illustrated in FIG. 8. Hereinafter, therefore, a rear cover will be described in detail, the other elements are referred to by the same reference numerals as FIG. 8, and their repetitive descriptions are omitted or will be briefly given.

With reference to FIGS. 10 to 12, the display apparatus according to another embodiment of the present disclosure may include a display module 100, a supporting part 200, a rear cover 300, a vibration generating module 400, and a structure 900.

The rear cover 300 according to another embodiment of the present disclosure may further include at least one second hole 420. The at least one second hole 420 may overlap the vibration generating module 400. For example, the at least one second hole 420 may overlap first and second sound generating devices 410 and 430. For example, the at least one second hole 420 may be formed by a patterning process or a punching process performed on the rear cover 300, but embodiments of the present disclosure are not limited thereto.

For example, the at least one second hole 420 may enhance a reflection characteristic of a sound between the rear cover 300 and the vibration generating module 400, thereby enhancing a sound of the high-pitched sound band. For example, the at least one second hole 420 may enhance a reflection characteristic of a sound between the rear cover 300 and the first and second sound generating devices 410 and 430, thereby enhancing a sound of the high-pitched sound band. For example, the rear cover 300 including the at least one second hole 420 and a connection member 800 whose one side (or portion) or one side surface is open may include a sound guide structure which guides a sound of the vibration generating module 400 so to be output in a forward direction or a lateral direction of the display module 100. For example, the rear cover 300 including the at least one second hole 420 may include a sound guide structure which guides the sound of the vibration generating module 400 so to be output in the forward direction or the lateral direction of the display module 100. For example, the rear cover 300 including the at least one second hole 420 may include a sound guide structure which guides sounds of the first and second sound generating devices 410 and 430 so to be output in the forward direction or the lateral direction of the display module 100. For example, the rear cover 300 including the at least one second hole 420 and the connection member 800, whose the one side (or portion) or the one side surface is open, and/or the structure 900 may include a sound guide structure which guides the sound of the vibration generating module 400 so to be output in the forward direction or the lateral direction of the display module 100. For example, the rear cover 300 including the at least one second hole 420 and/or the structure 900 may include a sound guide structure which guides the sounds of the first and second sound generating devices 410 and 430 so to be output in the forward direction or the lateral direction of the display module 100.

For example, the sound of the vibration generating module 400 may be output through or via a second hole 420 in the forward direction of the display module 100. For example, the sounds of the first and second sound generating devices 410 and 430 may be output through or via the second hole 420 in the forward direction of the display module 100. For example, a path of the sounds generated by the first sound generating device 410 and the second sound generating device 430 through the second hole 420 may be a fourth sound path SP4. For example, the fourth sound path SP4 may be a forward direction (or a thickness direction of the display module) and a lateral direction in which a sound is output by a rear surface of the display module 100 through or via the second hole 420. For example, the fourth sound path SP4 may be a forward direction in which a sound is output in a gap space GS (or a sound outputting space)

between the vibration generating module 400 and the rear cover 300. For example, a path of the sound generated by the vibration generating module 400 may be a fifth sound path SP5. For example, a path of sounds generated by the first sound generating device 410 and the second sound generating device 430 may be a fifth sound path SP5. For example, the fifth sound path SP5 may be a forward direction (or a thickness direction of the display module) and a lateral direction in which a sound is reflected by the rear surface of the display module 100. For example, the fifth sound path SP5 may be a direction in which the sound of the vibration generating module 400 is reflected by a side surface of the structure 900 and is output in the forward direction of the display module 100. For example, the fifth sound path SP5 may be a forward direction and a lateral direction in which a sound is reflected from the gap space GS (or the sound outputting space) between the vibration generating module 400 and the rear cover 300, and may be a forward direction and a lateral direction in which a sound is output through the second connection member 800. For example, the fifth sound path SP5 may be a direction in which the sounds of the first sound generating device 410 and the second sound generating device 430 are reflected by the side surface of the structure 900 and are output in the forward direction of the display module 100. For example, the fifth sound path SP5 may be a forward direction and a lateral direction in which a sound is reflected from the gap space GS (or the sound outputting space) between the vibration generating module 400 and the rear cover 300. Therefore, a sound by the vibration generating module 400 may be output through the fourth sound path SP4 and the fifth sound path SP5, thereby providing a display apparatus for more enhancing a sound of the high-pitched sound band. For example, sounds may be output by the first and second sound generating devices 410 and 430 through or via the fourth sound path SP4 and the fifth sound path SP5, thereby providing a display apparatus for more enhancing a sound of the high-pitched sound band.

As described above with respect to FIG. 9, the vibration generating module 400 may be disposed to be inclined with respect to a rear surface of the rear cover 300. For example, the first and second sound generating devices 410 and 430 may be disposed to be inclined with respect to the rear surface of the rear cover 300. For example, the sound of the vibration generating module 400 may be reflected between the vibration generating module 400 and the rear surface of the rear cover 300 and may be output through the at least one second hole 420 in the forward direction of the display module 100. For example, the sounds of the first and second sound generating devices 410 and 430 may be reflected between the first and second sound generating devices 410 and 430 and the rear surface of the rear cover 300 and may be output through or via the at least one second hole 420 in the forward direction of the display module 100. Accordingly, since a connection member whose one side or one side surface is open is provided, the sound of the vibration generating module 400 may be output in the lateral direction, and a region where a sound between the rear cover 300 and the vibration generating module 400 is reflected may be increased by the inclined vibration generating module 400, thereby enhancing a sound characteristic of the high-pitched sound band of the vibration generating module 400. Therefore, a region where a sound between the rear cover 300 and the vibration generating module 400 is reflected may be increased by the inclined vibration generating module 400, the sound may be output through the second hole 420 in the forward direction of the display module 100, and the sound may be reflected by a side surface of the structure 900 and may be output in the forward direction of the display module 100, thereby more enhancing a sound characteristic of the high-pitched sound band and enhancing a sound of the low-pitched sound band. For example, a region where a sound of each of the first and second sound generating devices 410 and 430 is reflected may increase due to a sound reflected by the rear cover 300, the sound may be output through the second hole 420 in the forward direction of the display module 100, and the sound may be reflected by the side surface of the structure 900 and may be output in the forward direction of the display module 100, thereby more enhancing a sound characteristic of the high-pitched sound band and enhancing a sound of the low-pitched sound band.

Figure 13:
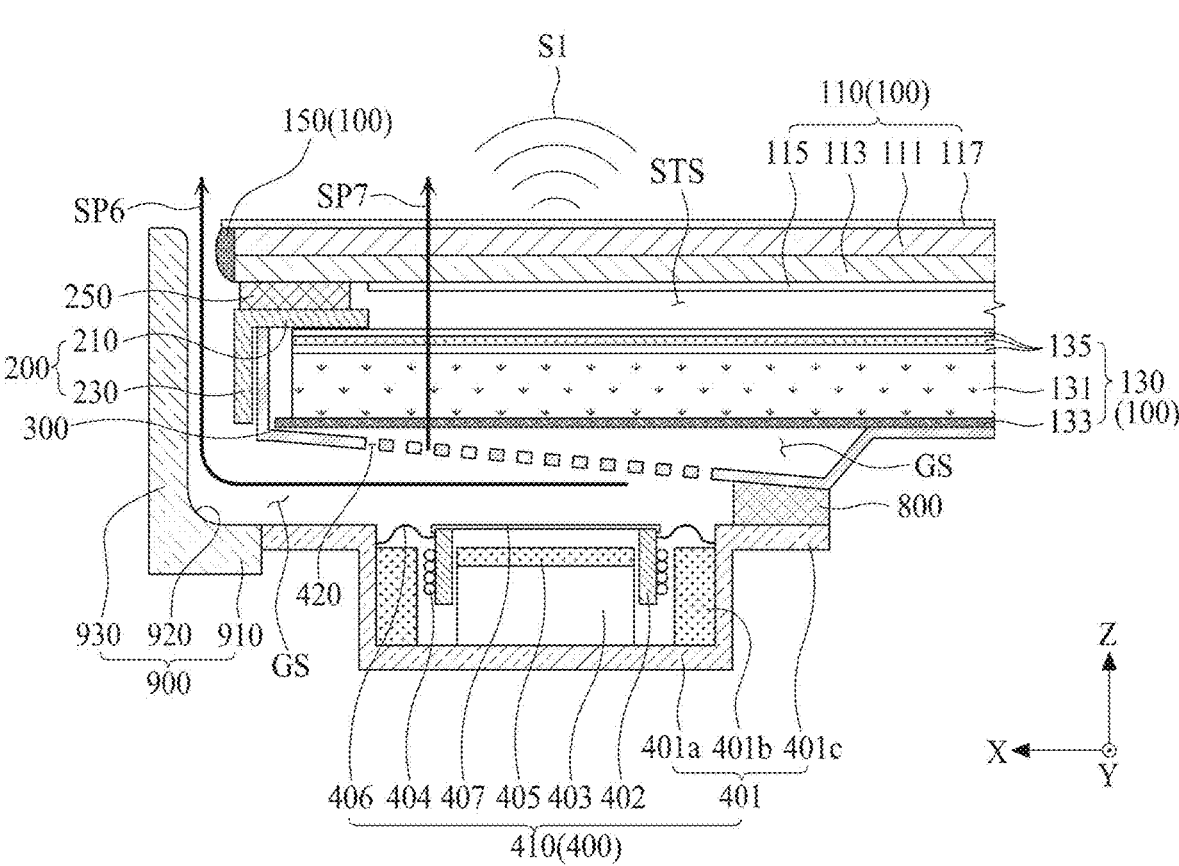
FIG. 13 illustrates a display apparatus according to another embodiment of the present disclosure.
Figure 14:
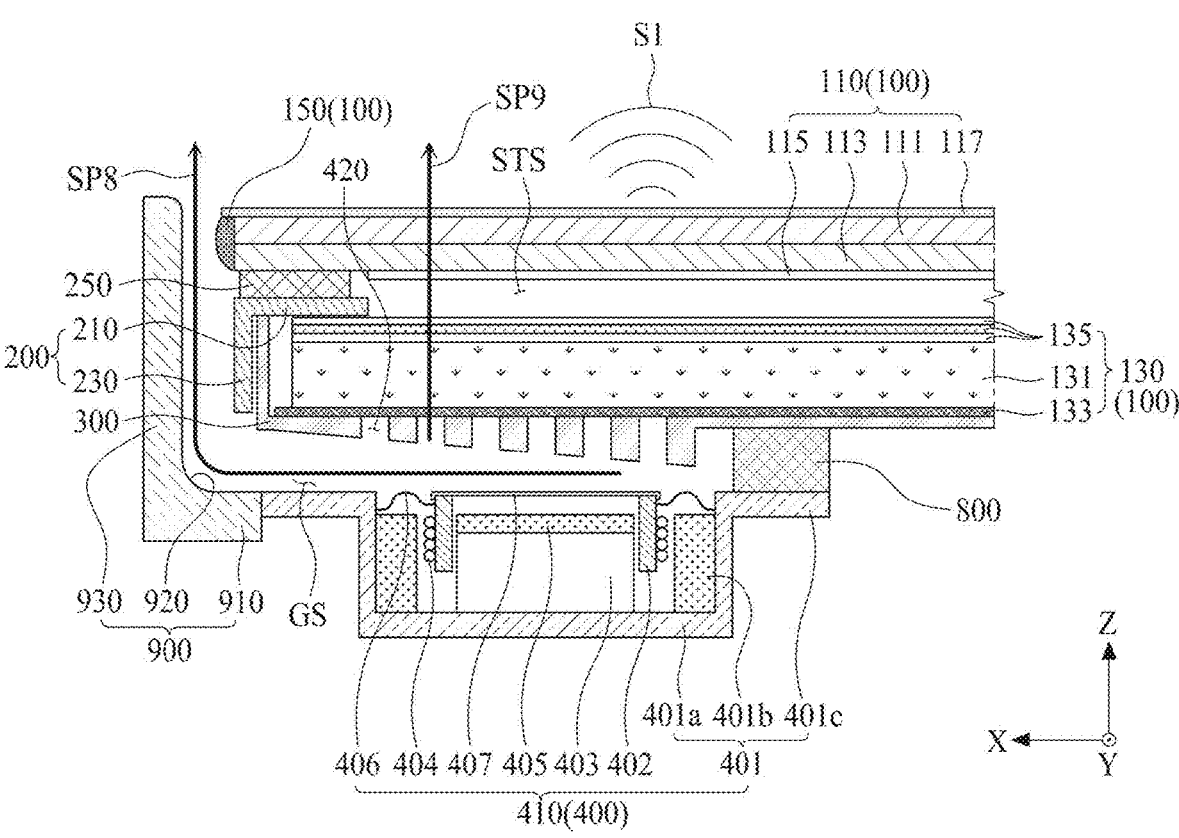
FIG. 14 illustrates a display apparatus according to another embodiment of the present disclosure.

FIG. 13 illustrates a display apparatus according to another embodiment of the present disclosure. FIG. 14 illustrates a display apparatus according to another embodiment of the present disclosure. FIGS. 13 and 14 illustrate another embodiment of the present disclosure implemented by modifying a structure of a rear cover in the display apparatus illustrated in FIG. 12. Hereinafter, therefore, a rear cover will be described in detail, the other elements are referred to by the same reference numerals as FIG. 12, and their repetitive descriptions are omitted or will be briefly given.

With reference to FIGS. 13 and 14, a rear cover 300 may be disposed to be inclined with respect to a vibration generating module 400. For example, the rear cover 300 may be disposed to be inclined with respect to first and second sound generating devices 410 and 430. For example, the rear cover 300 may include at least one hole 420, and the at least one hole 420 may vary or change toward a center portion of the rear cover 300.

For example, the rear cover 300 including the at least one hole 420 of FIG. 13 may be formed through press forming or press molding, but embodiments of the present disclosure are not limited thereto. For example, at least one pattern 420 of FIG. 14 may be formed by a patterning process or a punching process performed on the rear cover 300, but embodiments of the present disclosure are not limited thereto. At least one hole 420 of FIG. 14 may be at least one pattern. For example, the at least one hole or pattern 420 may be formed by patterning, chemical-etching, or drilling the rear cover 300 or numerical control (NC) processing (for example, processing by a numerical control machine tool) or laser processing performed on the rear cover 300, but embodiments of the present disclosure are not limited thereto.

For example, the at least one hole or pattern 420 may be implemented to enhance a sound output at a side surface of the display module 100. For example, the at least one hole or pattern 420 may have a height which is progressively reduced from one side (or portion) thereof to the other side (or portion) opposite to the one side (or portion). For example, the at least one hole or structural pattern 420 may vary or change toward a center portion of the rear cover 300. For example, the at least one hole or pattern 420 may vary from one side (or portion) of the display module 100 to the other side (or portion) thereof. For example, the at least one hole or pattern 420 overlapping the vibration generating module 400 may vary from the one side (or portion) of the display module 100 to the other side (or portion) thereof. For example, the at least one hole or pattern 420 overlapping the first sound generating device 410 may vary from the one side (or portion) of the display module 100 to the other side (or portion) thereof. The at least one hole or pattern 420 overlapping the second sound generating device 430 may vary from the other side (or portion) of the display module 100 to the one side (or portion) thereof.

For example, a degree to which the rear cover 300 is inclined may vary from one side (or portion) of the display module 100 to the other side (or portion) thereof so that a sound output at a side surface of the display module 100 is enhanced. For example, when a side at which the second connection member 800 is disposed is the one side (or portion) of the display module 100, a degree to which the rear cover 300 is inclined may increase from the one side (or portion) of the display module 100 to the other side (or portion) thereof. Therefore, a sound of the vibration generating module 400 may be efficiently output at the other side of the second connection member 800 whose the one side (or portion) is open. For example, sounds of the first and second sound generating devices 410 and 430 may be efficiently output at the other side (or portion) of the second connection member 800 whose the one side (or portion) is open. For example, the sound of the vibration generating module 400 may be reflected between the vibration generating module 400 and a rear surface of the rear cover 300 and may be output in the forward direction of the display module 100, and may be reflected by a side surface of the structure 900 and may be output in the forward direction of the display module 100. For example, the sounds of the first and second sound generating devices 410 and 430 may be reflected between the first and second sound generating devices 410 and 430 and the rear surface of the rear cover 300 and may be output in the forward direction of the display module 100, and may be reflected by the side surface of the structure 900 and may be output in the forward direction of the display module 100.

For example, the at least one second hole 420 may enhance a reflection characteristic of a sound between the rear cover 300 and the vibration generating module 400, thereby enhancing a sound of the high-pitched sound band. For example, the at least one second hole 420 may enhance a reflection characteristic of a sound between the rear cover 300 and the first and second sound generating devices 410 and 430, thereby enhancing a sound of the high-pitched sound band. For example, the rear cover 300 including the at least one second hole 420 and a connection member 800 whose one side (or portion) or one side surface is open may include a sound guide structure which guides a sound of the vibration generating module 400 so to be output in a forward direction or a lateral direction of the display module 100. For example, the rear cover 300 including the at least one second hole 420 and the connection member 800 whose the one side (or portion) or the one side surface is open may include a sound guide structure which guides the sounds of the first and second sound generating devices 410 and 430 so to be output in the forward direction or the lateral direction of the display module 100. For example, the rear cover 300 including the at least one second hole 420 and the connection member 800, whose the one side (or portion) or the one side surface is open, and/or the structure 900 may include a sound guide structure which guides the sound of the vibration generating module 400 so to be output in the forward direction or the lateral direction of the display module 100. For example, the rear cover 300 including the at least one second hole 420 and the connection member 800, whose the one side (or portion) or the one side surface is open, and/or the structure 900 may include a sound guide structure which guides the sounds of the first and second sound generating devices 410 and 430 so to be output in the forward direction or the lateral direction of the display module 100.

With reference to FIG. 13, the sound generated by the vibration generating module 400 may be reflected by a rear surface of the display module 100 and may be output in the lateral direction and the forward direction of the display module 100. For example, the sounds generated by the first and second sound generating devices 410 and 430 may be reflected by the rear surface of the display module 100 and may be output in the lateral direction and the forward direction of the display module 100. For example, a path of the sound generated by the vibration generating module 400 may be a sixth sound path SP6. For example, a path of the sounds generated by the first and second sound generating devices 410 and 430 may be the sixth sound path SP6. For example, the sixth sound path SP6 may be a direction in which the sound of the vibration generating module 400 is reflected by a side surface of the structure 900 and is output in the forward direction of the display module 100. For example, the sixth sound path SP6 may be a direction in which the sounds of the first and second sound generating devices 410 and 430 are reflected by the side surface of the structure 900 and are output in the forward direction of the display module 100. For example, the sixth sound path SP6 may be a forward direction and a lateral direction in which a sound is reflected from the gap space GS (or the sound outputting space) between the vibration generating module 400 and the rear cover 300, and may be a forward direction and a lateral direction in which a sound is output through or via the second connection member 800. For example, the sixth sound path SP6 may be a forward direction and a lateral direction in which a sound is reflected from the gap space GS (or the sound outputting space) between the vibration generating module 400 and the rear cover 300.

The sound of the vibration generating module 400 may be output through or via a second hole 420 in the forward direction of the display module 100. For example, the sounds of the first and second sound generating devices 410 and 430 may be output through or via the second hole 420 in the forward direction of the display module 100. For example, a path of the sound generated by the vibration generating module 400 through or via the second hole 420 may be a seventh sound path SP7. For example, a path of each of the sounds generated by the first and second sound generating devices 410 and 430 through or via the second hole 420 may be the seventh sound path SP7. For example, the seventh sound path SP7 may be a forward direction (or a thickness direction of the display module) in which a sound is output by the rear surface of the display module 100 through or via the second hole 420. For example, the seventh sound path SP7 may be a forward direction in which a sound is output in the gap space GS (or the sound outputting space) between the vibration generating module 400 and the rear cover 300 through or via the second hole 420. Therefore, a sound by the vibration generating module 400 may be output through or via the sixth sound path SP6 and the seventh sound path SP7, thereby providing a display apparatus for more enhancing a sound of the high-pitched sound band.

Therefore, a region where a sound between the rear cover 300 and the vibration generating module 400 is reflected may be increased by the vibration generating module 400 including the second hole 420, thereby enhancing a sound of the high-pitched sound band. For example, since a connection member whose one side (or portion) or one side surface is open is provided, the sound of the vibration generating module 400 may be output in the lateral direction, and a region where a sound between the rear cover 300 and the vibration generating module 400 is reflected may be increased by the vibration generating module 400 including the second hole 420. Therefore, a region where the sound of the vibration generating module 400 is reflected may increase due to a sound reflected by the rear cover 300, and the sound may be output through the second hole 420 in the forward direction of the display module 100, thereby providing a display apparatus for enhancing a sound of the high-pitched sound band. For example, a region where a sound of each of the first and second sound generating devices 410 and 430 is reflected may increase due to a sound reflected by the rear cover 300, the sound may be output through or via the second hole 420 in the forward direction of the display module 100, and the sound may be reflected by the side surface of the structure 900 and may be output in the forward direction of the display module 100, thereby providing a display apparatus for enhancing a sound of the high-pitched sound band.

With reference to FIG. 14, the sound generated by the vibration generating module 400 may be reflected by the rear surface of the display module 100 and may be output in the lateral direction and the forward direction of the display module 100. For example, the sounds generated by the first and second sound generating devices 410 and 430 may be reflected by the rear surface of the display module 100 and may be output in the lateral direction and the forward direction of the display module 100. For example, a path of the sound generated by the vibration generating module 400 may be an eighth sound path SP8. For example, a path of the sounds generated by the first and second sound generating devices 410 and 430 may be the eighth sound path SP8. For example, the eighth sound path SP8 may be a direction in which the sound of the vibration generating module 400 is reflected by the side surface of the structure 900 and is output in the forward direction of the display module 100. For example, the eighth sound path SP8 may be a direction in which the sounds of the first and second sound generating devices 410 and 430 are reflected by the side surface of the structure 900 and are output in the forward direction of the display module 100. For example, the eighth sound path SP8 may be a forward direction and a lateral direction in which a sound is reflected from the gap space GS (or the sound outputting space) between the vibration generating module 400 and the rear cover 300, and may be a forward direction and a lateral direction in which a sound is output through or via the second connection member 800. For example, the eighth sound path SP8 may be a forward direction and a lateral direction in which a sound is reflected from the gap space GS (or the sound outputting space) between the vibration generating module 400 and the rear cover 300.

The sound of the vibration generating module 400 may be output through a second pattern 420 in the forward direction of the display module 100. For example, the sounds of the first and second sound generating devices 410 and 430 may be output through the second pattern 420 in the forward direction of the display module 100. For example, a path of the sound generated by the vibration generating module 400 through or via the second pattern 420 may be a ninth sound path SP9. For example, a path of the sounds generated by the first and second sound generating devices 410 and 430 through or via the second pattern 420 may be the ninth sound path SP9. For example, the ninth sound path SP9 may be a forward direction (or a thickness direction of the display module) in which a sound is output by the rear surface of the display module 100 through or via the second pattern 420. For example, the ninth sound path SP9 may be a forward direction in which a sound is output in the gap space GS (or the sound outputting space) between the vibration generating module 400 and the rear cover 300 through or via the second pattern 420. Therefore, a sound by the vibration generating module 400 may be output through or via the eighth sound path SP8 and the ninth sound path SP9, thereby providing a display apparatus for more enhancing a sound of the high-pitched sound band.

Therefore, a region where a sound between the rear cover 300 and the vibration generating module 400 is reflected may be increased by the rear cover 300 including the second pattern 420, thereby enhancing a sound of the high-pitched sound band. For example, since a connection member whose one side or one side surface is open is provided, the sound of the vibration generating module 400 may be output in the lateral direction, and a region where a sound between the rear cover 300 and the vibration generating module 400 is reflected may be increased by the rear cover 300 including the second pattern 420. Therefore, a region where the sound of the vibration generating module 400 is reflected may increase due to a sound reflected by the rear cover 300, and the sound may be output through or via the second pattern 420 in the forward direction of the display module 100, thereby providing a display apparatus for enhancing a sound of the high-pitched sound band. For example, a region where a sound of each of the first and second sound generating devices 410 and 430 is reflected may increase due to a sound reflected by the rear cover 300, the sound may be output through the second pattern 420 in the forward direction of the display module 100, and the sound may be reflected by the side surface of the structure 900 and may be output in the forward direction of the display module 100, thereby providing a display apparatus for enhancing a sound of the high-pitched sound band.

Although the structure 900 is not provided in FIGS. 13 and 14, a region where the sound of the vibration generating module 400 is reflected may be increased by a structure of the inclined rear cover 300 and/or the second hole or pattern 420 disposed in the rear cover 300, and the sound may be output through or via the second hole or pattern 420 in the forward direction of the display module 100, thereby providing a display apparatus for enhancing a sound of the high-pitched sound band. For example, the sound of the vibration generating module 400 may be reflected by the inclined rear cover 300 to increase a sound diffracted in the high-pitched sound band, and the sound may travel in the forward direction of the display module 100, thereby providing a display apparatus for enhancing a sound of the high-pitched sound band.

Figure 15:
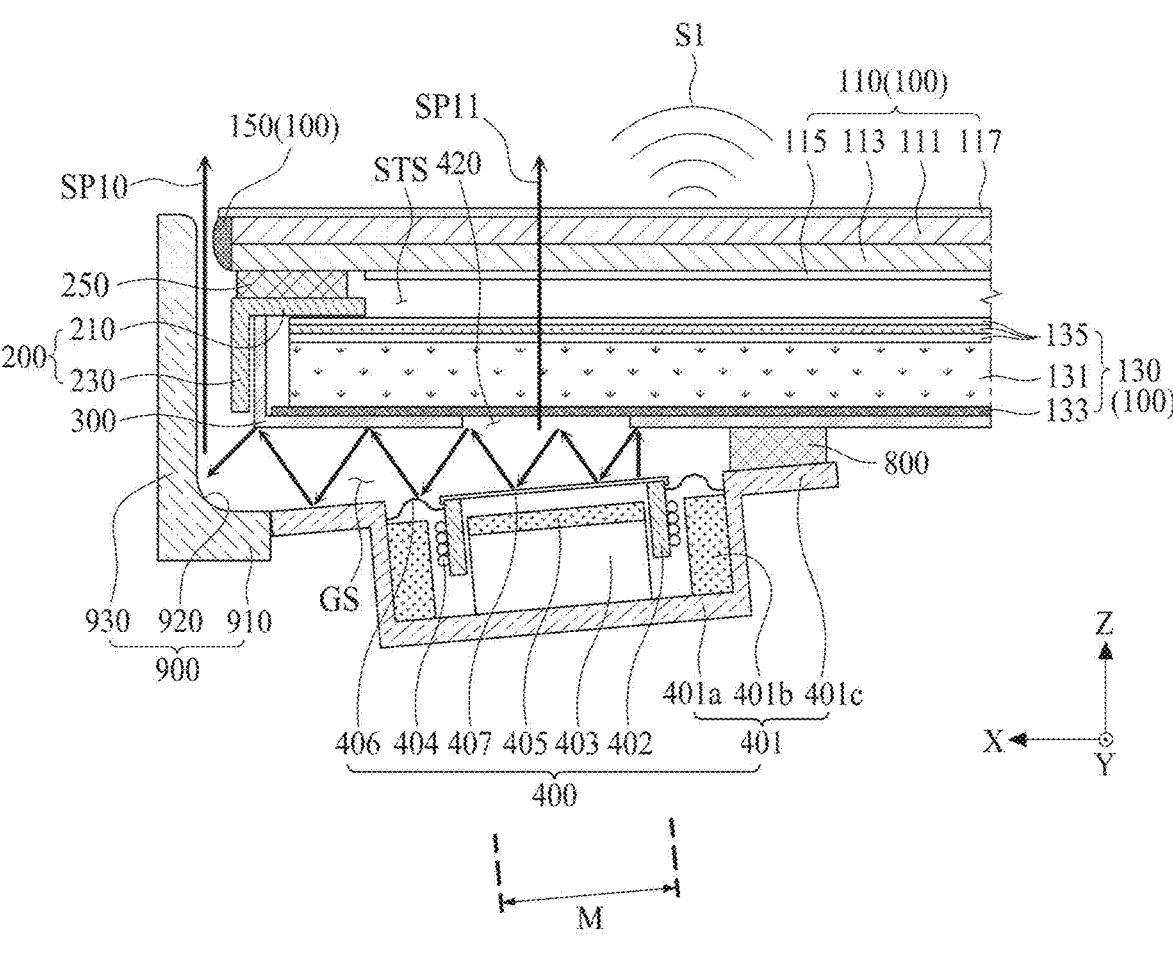
FIG. 15 illustrates a display apparatus according to another embodiment of the present disclosure.

FIG. 15 illustrates a display apparatus according to another embodiment of the present disclosure. FIG. 15 is an embodiment of the present disclosure implemented by modifying a structure of the rear cover illustrated in FIG. 9. Hereinafter, therefore, a rear cover will be described in detail, the other elements are referred to by the same reference numerals as FIG. 9, and their repetitive descriptions are omitted or will be briefly given.

With reference to FIG. 15, a vibration generating module 400 may be disposed to be inclined with respect to a rear surface of a rear cover 300. For example, the vibration generating module 400 may be disposed to be inclined by a second connection member 800 whose one side (or portion) is open. For example, the vibration generating module 400 may be inclined by a height of the second connection member 800. For example, the second connection member 800 may have a height which is progressively reduced from one side (or portion) thereof to the other side (or portion) opposite to the one side (or portion). For example, the second connection member 800 may include a first side parallel to the one side (or portion) thereof, a second side connected to one end (or portion) of the first side, and a third side connected to the other end (or portion) of the first side in parallel with the second side, and a height of the second side and the third side may have a lower height (a thickness) as it nears the first side.

For example, a degree to which the vibration generating module 400 is inclined may vary from one side (or portion) of the rear cover 300 to the other side (or portion) thereof so that a sound output at a side surface of the display module 100 is enhanced. For example, when a side at which the second connection member 800 is disposed is the one side (or portion) of the rear cover 300, a degree to which the vibration generating module 400 is inclined may increase from the one side (or portion) of the rear cover 300 to the other side (or portion) thereof. For example, a degree to which the vibration generating module 400 is inclined may increase from a center portion of the rear cover 300 to a side surface (or a sidewall) thereof. Therefore, the sound of the vibration generating module 400 may be efficiently output at the other side (or portion) of the second connection member 800 whose the one side (or portion) is open.

The rear cover 300 according to another embodiment of the present disclosure may be disposed in a region except a magnetic field region M corresponding to a magnet member 403 of the vibration generating module 400. For example, the rear cover 300 may be disposed in a region except a magnetic field region M corresponding to a magnet member 403 of the first and second sound generating devices 410 and 430. For example, a portion except the magnetic field region M may be a second hole 420 of the rear cover 300. The rear cover 300 may include an elecytroplated steel sheet (for example, an electrolytically galvanized steel sheet (EGI) or an iron (Fe)-based material. For example, the elecytroplated steel sheet may be formed by electrically plating zinc (Zn). Therefore, the rear cover 300 may be disposed in a region except the magnetic field region M of the vibration generating module 400, and thus, an influence of a magnetic field caused by the rear cover 300 may be reduced on the vibration generating module 400, thereby enhancing a sound characteristic of the vibration generating module 400. For example, the rear cover 300 may be disposed in a region except the magnetic field region M of each of the first and second sound generating devices 410 and 430, and thus, an influence of a magnetic field caused by the rear cover 300 may be reduced on the first and second sound generating devices 410 and 430, thereby enhancing a sound characteristic of the first and second sound generating devices 410 and 430.

For example, the rear cover 300 including at least one second hole 420 and a connection member 800 whose one side (or portion) or one side surface is open may include a sound guide structure which guides a sound of the vibration generating module 400 so to be output in a forward direction or a lateral direction of the display module 100. For example, the rear cover 300 including the at least one second hole 420 may include a sound guide structure which guides the sound of the vibration generating module 400 so to be output in the forward direction or the lateral direction of the display module 100. For example, the rear cover 300 including the at least one second hole 420 may include a sound guide structure which guides sounds of the first and second sound generating devices 410 and 430 so to be output in the forward direction or the lateral direction of the display module 100. For example, the rear cover 300 including the at least one second hole 420 and the connection member 800, whose the one side (or portion) or the one side surface is open, and/or a structure 900 may include a sound guide structure which guides the sound of the vibration generating module 400 so to be output in the forward direction or the lateral direction of the display module 100. For example, the rear cover 300 including the at least one second hole 420 and/or the structure 900 may include a sound guide structure which guides the sound of the vibration generating module 400 so to be output in the forward direction or the lateral direction of the display module 100. For example, the rear cover 300 including the at least one second hole 420 and/or the structure 900 may include a sound guide structure which guides the sounds of the first and second sound generating devices 410 and 430 so to be output in the forward direction or the lateral direction of the display module 100.

For example, the sound of the vibration generating module 400 may be reflected between the vibration generating module 400 and a rear surface of the rear cover 300 and may be output in the forward direction of the display module 100. For example, the sounds of the first and second sound generating devices 410 and 430 may be reflected between the first and second sound generating devices 410 and 430 and the rear surface of the rear cover 300 and may be output in the forward direction of the display module 100. For example, the sound of the vibration generating module 400 may be reflected between the vibration generating module 400 and a rear surface of the rear cover 300 corresponding to the magnetic field region M and may be output in the forward direction of the display module 100. For example, the sounds of the first and second sound generating devices 410 and 430 may be reflected between the vibration generating module 400 and a rear surface of the rear cover 300 corresponding to the magnetic field region M and may be output in the forward direction of the display module 100. For example, the sounds of the first and second sound generating devices 410 and 430 may be reflected by a side surface of the structure 900 and may be output in the forward direction of the display module 100. For example, since the connection member 800 whose one side (or portion) or one side surface is open is provided, the sound of the vibration generating module 400 may be output in the lateral direction, thereby enhancing a sound of the high-pitched sound band. For example, since the connection member 800 whose one side (or portion) or one side surface is open is provided, the sound of the vibration generating module 400 may be output in the lateral direction, and a region where a sound between the rear cover 300 and the vibration generating module 400 is reflected may be increased by the inclined vibration generating module 400, thereby enhancing a sound of the high-pitched sound band. Therefore, a region where the sound of the vibration generating module 400 is reflected may increase due to a sound reflected by the rear cover 300, the sound may be reflected by the side surface of the structure 900 and may be output in the forward direction of the display module 100, and the sound may be reflected from the magnetic field region M and may be output in the forward direction of the display module 100, thereby more enhancing a sound of the high-pitched sound band. For example, a region where the sounds of the first and second sound generating devices 410 and 430 are reflected may increase due to a sound reflected by the rear cover 300, the sounds may be reflected by the side surface of the structure 900 and may be output in the forward direction of the display module 100, and the sounds may be reflected from the magnetic field region M and may be output in the forward direction of the display module 100, thereby more enhancing a sound of the high-pitched sound band.

For example, a path of the sound generated by the vibration generating module 400 may be a tenth sound path SP10. For example, a path of the sounds generated by the first sound generating device 410 and the second sound generating device 430 may be the tenth sound path SP10. For example, the tenth sound path SP10 may be a forward direction (or a thickness direction of the display module) and a lateral direction in which a sound is reflected by the rear surface of the display module 100. For example, the tenth sound path SP10 may be a forward direction and a lateral direction in which a sound is reflected from the gap space GS (or the sound outputting space) between the vibration generating module 400 and the rear cover 300, and may be a forward direction in which a sound is reflected by a side surface of the structure 900. For example, the tenth sound path SP10 may be a forward direction and a lateral direction in which a sound is reflected from the gap space GS (or the sound outputting space) between the vibration generating module 400 and the rear cover 300, and may be a forward direction and a lateral direction in which a sound is output through or via the second connection member 800. For example, the tenth sound path SP10 may be a lateral direction and a forward direction in which a sound is reflected from the magnetic field region M and/or the second hole 420, and may be a forward direction in which a sound is reflected by the structure 900.

For example, the sound of the vibration generating module 400 may be output through or via the second hole 420 in the forward direction of the display module 100. For example, the sounds of the first and second sound generating devices 410 and 430 may be output through or via the second hole 420 in the forward direction of the display module 100. For example, a path of the sound generated by the vibration generating module 400 through or via the second hole 420 may be an eleventh sound path SP11. For example, a path of sounds generated by the first sound generating device 410 and the second sound generating device 430 through the second hole 420 may be the eleventh sound path SP11. For example, the eleventh sound path SP11 may be a forward direction (or a thickness direction of the display module) in which a sound is output by the rear surface of the display module 100 through the second hole 420 and/or the magnetic field region M. For example, the eleventh sound path SP11 may be a forward direction in which a sound is output in a gap space GS (or a sound outputting space) between the vibration generating module 400 and the rear cover 300. Therefore, a sound by the vibration generating module 400 may be output through or via the tenth sound path SP10 and the eleventh sound path SP11, thereby providing a display apparatus for more enhancing a sound of the high-pitched sound band.

Although the structure 900 is not provided in FIG. 15, a region where the sound of the vibration generating module 400 is reflected may be increased by a structure of the inclined vibration generating module 400 and/or the second hole 420 disposed in the rear cover 300, and the sound may be output through the second hole 420 in the forward direction of the display module 100, thereby providing a display apparatus for enhancing a sound of the high-pitched sound band. For example, the sound of the vibration generating module 400 may be reflected by the inclined vibration generating module 400 to increase a sound diffracted in the high-pitched sound band, and the sound may travel in the forward direction of the display module 100, thereby providing a display apparatus for enhancing a sound of the high-pitched sound band.

Figure 16:
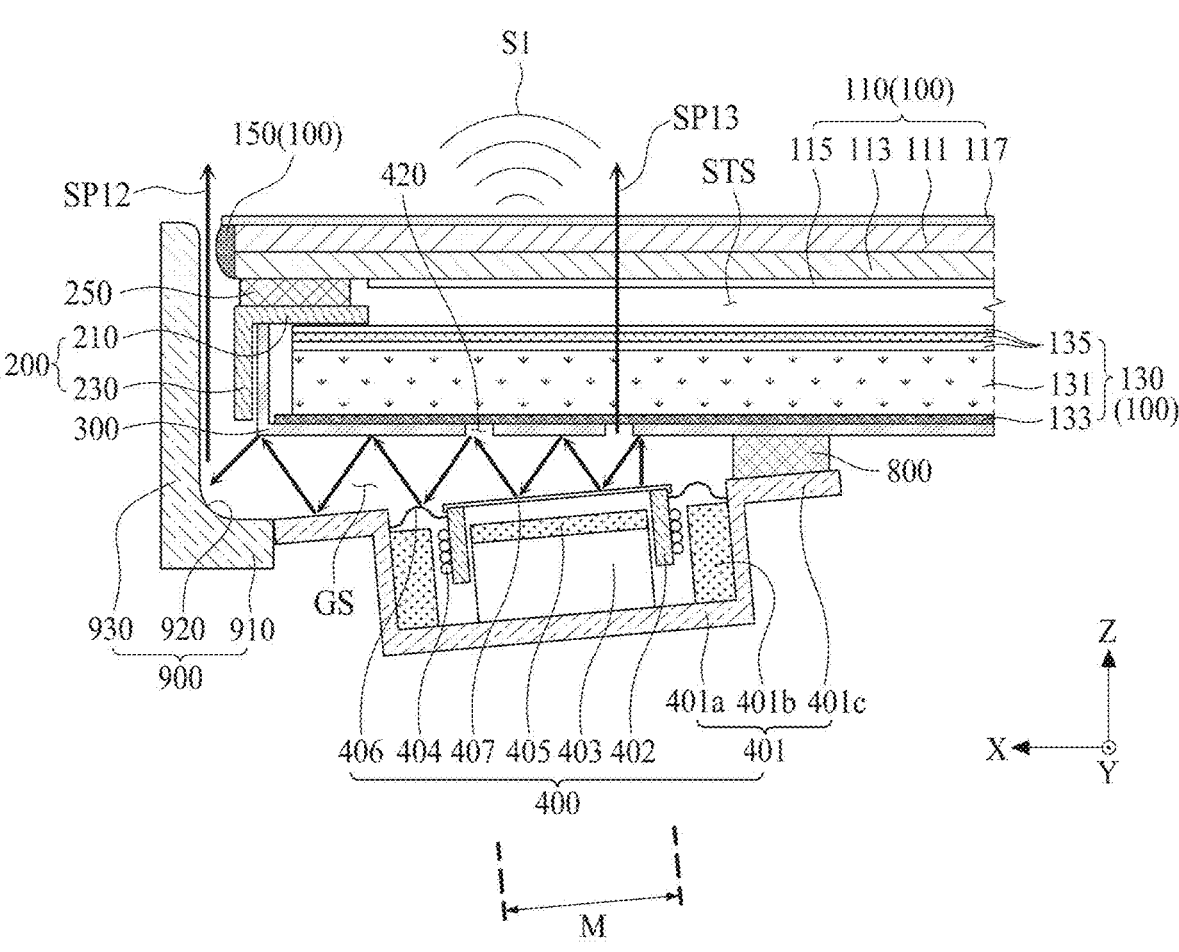
FIG. 16 illustrates a display apparatus according to another embodiment of the present disclosure.

FIG. 16 illustrates a display apparatus according to another embodiment of the present disclosure. FIG. 16 illustrates an embodiment of the present disclosure implemented by modifying a structure of a rear cover in the display apparatus illustrated in FIGS. 9 and 15. Hereinafter, therefore, a rear cover will be described in detail, the other elements are referred to by the same reference numerals as FIGS. 9 and 15, and their repetitive descriptions are omitted or will be briefly given.

With reference to FIG. 16, a vibration generating module 400 may be disposed to be inclined with respect to a rear surface of a rear cover 300. For example, the vibration generating module 400 may be disposed to be inclined by a second connection member 800 whose one side (or portion) is open. For example, the vibration generating module 400 may be inclined by a height of the second connection member 800. For example, the second connection member 800 may have a height which is progressively reduced from one side (or portion) thereof to the other side (or portion) opposite to the one side (or portion). For example, the second connection member 800 may include a first side parallel to the one side (or portion) thereof, a second side connected to one end (or portion) of the first side, and a third side connected to the other end (or portion) of the first side in parallel with the second side, and a height of each of the second side and the third side may have a lower height (a thickness) as it nears the first side.

For example, a degree to which the vibration generating module 400 is inclined may vary from one side (or portion) of the rear cover 300 to the other side (or portion) thereof so that a sound output at a side surface of the display module 100 is enhanced. For example, when a side at which the second connection member 800 is disposed is the one side (or portion) of the rear cover 300, a degree to which the vibration generating module 400 is inclined may increase from the one side (or portion) of the rear cover 300 to the other side thereof. For example, a degree to which the vibration generating module 400 is inclined may increase from a center portion of the rear cover 300 to a side (or sidewall) thereof. Therefore, a sound of the vibration generating module 400 may be efficiently output at the other side of the second connection member 800 whose the one side (or portion) is open.

A rear cover 300 according to another embodiment of the present disclosure may be disposed in a magnetic field region M corresponding to a magnet member 403 of a vibration generating module 400 and on a rear surface of a display module 100. For example, the rear cover 300 may be disposed in the magnetic field region M corresponding to a magnet member 403 of each of first and second sound generating devices 410 and 430 and on the rear surface of the display module 100. For example, a second hole 420 may be disposed between a portion except the magnetic field region M and the rear cover 300. For example, the rear cover 300 may include a material other than an iron (Fe)-based materials included in the magnet member. For example, the rear cover 300 may include one or more of an Al material, a Mg alloy material, a Mg—Li alloy material, and an Al alloy material. However, embodiments of the present disclosure are not limited thereto, and the rear cover 300 may be formed of a material that does not the iron (Fe) material. Therefore, the rear cover 300 may be disposed in the magnetic field region M, and the rear cover 300 including the second hole 420 may be implemented. For example, an influence of a magnetic field caused by the rear cover 300 may be reduced on the first and second sound generating devices 410 and 430, and a sound characteristic of the first and second sound generating devices 410 and 430 may be enhanced.

For example, the rear cover 300 including the at least one second hole 420 and a connection member 800 whose one side (or portion) or one side surface is open may include a sound guide structure which guides a sound of the vibration generating module 400 so to be output in a forward direction or a lateral direction of the display module 100. For example, the rear cover 300 including the at least one second hole 420 may include a sound guide structure which guides the sound of the vibration generating module 400 so to be output in the forward direction or the lateral direction of the display module 100. For example, the rear cover 300 including the at least one second hole 420 may include a sound guide structure which guides sounds of the first and second sound generating devices 410 and 430 so to be output in the forward direction or the lateral direction of the display module 100. For example, the rear cover 300 including the at least one second hole 420 and the connection member 800, whose the one side (or portion) or the one side surface is open, and/or the structure 900 may include a sound guide structure which guides the sound of the vibration generating module 400 so to be output in the forward direction or the lateral direction of the display module 100. For example, the rear cover 300 including the at least one second hole 420 and/or the structure 900 may include a sound guide structure which guides the sounds of the vibration generating module 400 so to be output in the forward direction or the lateral direction of the display module 100. For example, the rear cover 300 including the at least one second hole 420 and/or the structure 900 may include a sound guide structure which guides the sounds of the first and second sound generating devices 410 and 430 so to be output in the forward direction or the lateral direction of the display module 100.

For example, the sound of the vibration generating module 400 may be reflected between the vibration generating module 400 and a rear surface of the rear cover 300 and may be output in the forward direction of the display module 100. For example, the sounds of the first and second sound generating devices 410 and 430 may be reflected between the first and second sound generating devices 410 and 430 and the rear surface of the rear cover 300 and may be output in the forward direction of the display module 100. For example, the sound of the vibration generating module 400 may be reflected between the vibration generating module 400 and a rear surface of the rear cover 300 corresponding to the magnetic field region M and may be output in the forward direction of the display module 100. For example, the sounds of the first and second sound generating devices 410 and 430 may be reflected between the vibration generating module 400 and a rear surface of the rear cover 300 corresponding to the magnetic field region M and may be output in the forward direction of the display module 100. For example, the sounds of the vibration generating module 400 may be reflected by a side surface of the structure 900 and may be output in the forward direction of the display module 100. For example, the sounds of the first and second sound generating devices 410 and 430 may be reflected by a side surface of the structure 900 and may be output in the forward direction of the display module 100. For example, since the connection member 800 whose one side (or portion) or one side surface is open is provided, the sound of the vibration generating module 400 may be output in the lateral direction, thereby enhancing a sound of the high-pitched sound band. For example, since the connection member 800 whose one side (or portion) or one side surface is open is provided, the sound of the vibration generating module 400 may be output in the lateral direction, and a region where a sound between the rear cover 300 and the vibration generating module 400 is reflected may be increased by the inclined vibration generating module 400, thereby enhancing a sound of the high-pitched sound band. Therefore, a region where the sound of the vibration generating module 400 is reflected may increase due to a sound reflected by the rear cover 300, the sound may be reflected by the side surface of the structure 900 and may be output in the forward direction of the display module 100, and the sound may be reflected from the magnetic field region M and may be output in the forward direction of the display module 100, thereby more enhancing a sound of the high-pitched sound band. For example, a region where the sounds of the first and second sound generating devices 410 and 430 are reflected may increase due to a sound reflected by the rear cover 300, the sounds may be reflected by the side surface of the structure 900 and may be output in the forward direction of the display module 100, and the sounds may be reflected from the magnetic field region M and may be output in the forward direction of the display module 100, thereby more enhancing a sound of the high-pitched sound band.

For example, a path of the sound generated by the vibration generating module 400 may be a twelfth sound path SP12. For example, a path of the sounds generated by the first sound generating device 410 and the second sound generating device 430 may be the twelfth sound path SP12. For example, the twelfth sound path SP12 may be a forward direction (or a thickness direction of the display module) and a lateral direction in which a sound is reflected by the rear surface of the display module 100. For example, the twelfth sound path SP12 may be a forward direction and a lateral direction in which a sound is reflected from the gap space GS (or the sound outputting space) between the vibration generating module 400 and the rear cover 300, and may be a forward direction in which a sound is reflected by a side surface of the structure 900. For example, the twelfth sound path SP12 may be a forward direction and a lateral direction in which a sound is reflected from the gap space GS (or the sound outputting space) between the vibration generating module 400 and the rear cover 300, and may be a forward direction and a lateral direction in which a sound is output through or via the second connection member 800. For example, the twelfth sound path SP12 may be a lateral direction and a forward direction in which a sound is reflected from the magnetic field region M and/or the second hole 420, and may be a forward direction in which a sound is reflected by the structure 900.

The sound of the vibration generating module 400 may be output through the second hole 420 in the forward direction of the display module 100. For example, the sounds of the first and second sound generating devices 410 and 430 may be output through the second hole 420 in the forward direction of the display module 100. For example, a path of the sound generated by the vibration generating module 400 through or via the second hole 420 may be a thirteenth sound path SP13. For example, a path of each of sounds generated by the first sound generating device 410 and the second sound generating device 430 through or via the second hole 420 may be the thirteenth sound path SP13. For example, the thirteenth sound path SP13 may be a forward direction (or a thickness direction of the display module) in which a sound is output by the rear surface of the display module 100 through the second hole 420 and/or the magnetic field region M. For example, the thirteenth sound path SP13 may be a forward direction in which a sound is output in a gap space GS (or a sound outputting space) between the vibration generating module 400 and the rear cover 300. Therefore, a sound by the vibration generating module 400 may be output through the twelfth sound path SP12 and the thirteenth sound path SP13, thereby providing a display apparatus for more enhancing a sound of the high-pitched sound band.

Although the structure 900 is not provided in FIG. 16, a region where the sound of the vibration generating module 400 is reflected may be increased by a structure of the inclined vibration generating module 400 and/or the second hole 420, or the rear cover 300 of the magnetic field region M, and a sound reflected from the second hole or pattern 420, or the magnetic field region M may be output to the forward direction of the display module 100, thereby providing a display apparatus for enhancing a sound of the high-pitched sound band. For example, the sound of the vibration generating module 400 may be reflected by the inclined vibration generating module 400 to increase a sound diffracted in the high-pitched sound band, and the sound may travel in the forward direction of the display module 100, thereby providing a display apparatus for enhancing a sound of the high-pitched sound band.

Figure 17:
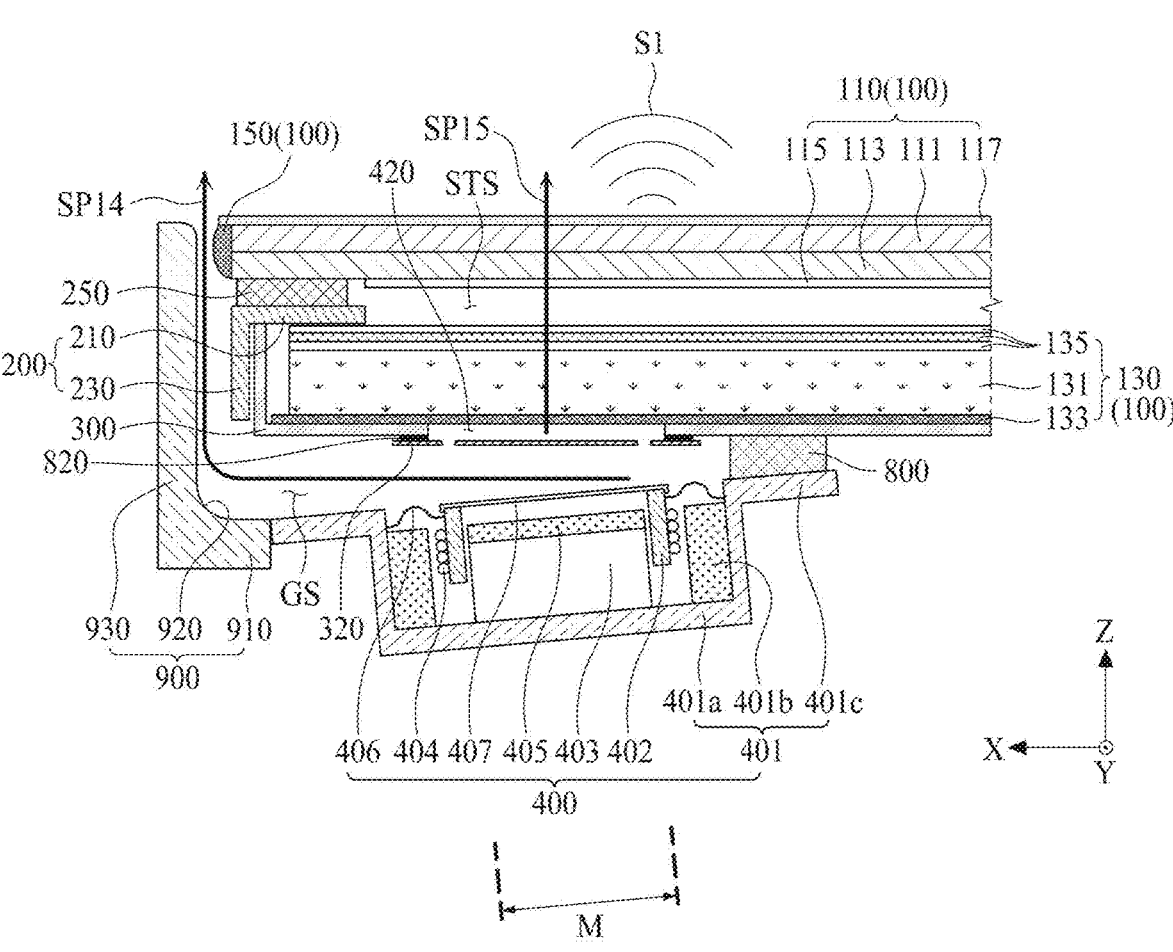
FIG. 17 illustrates a display apparatus according to another embodiment of the present disclosure.
Figure 18:
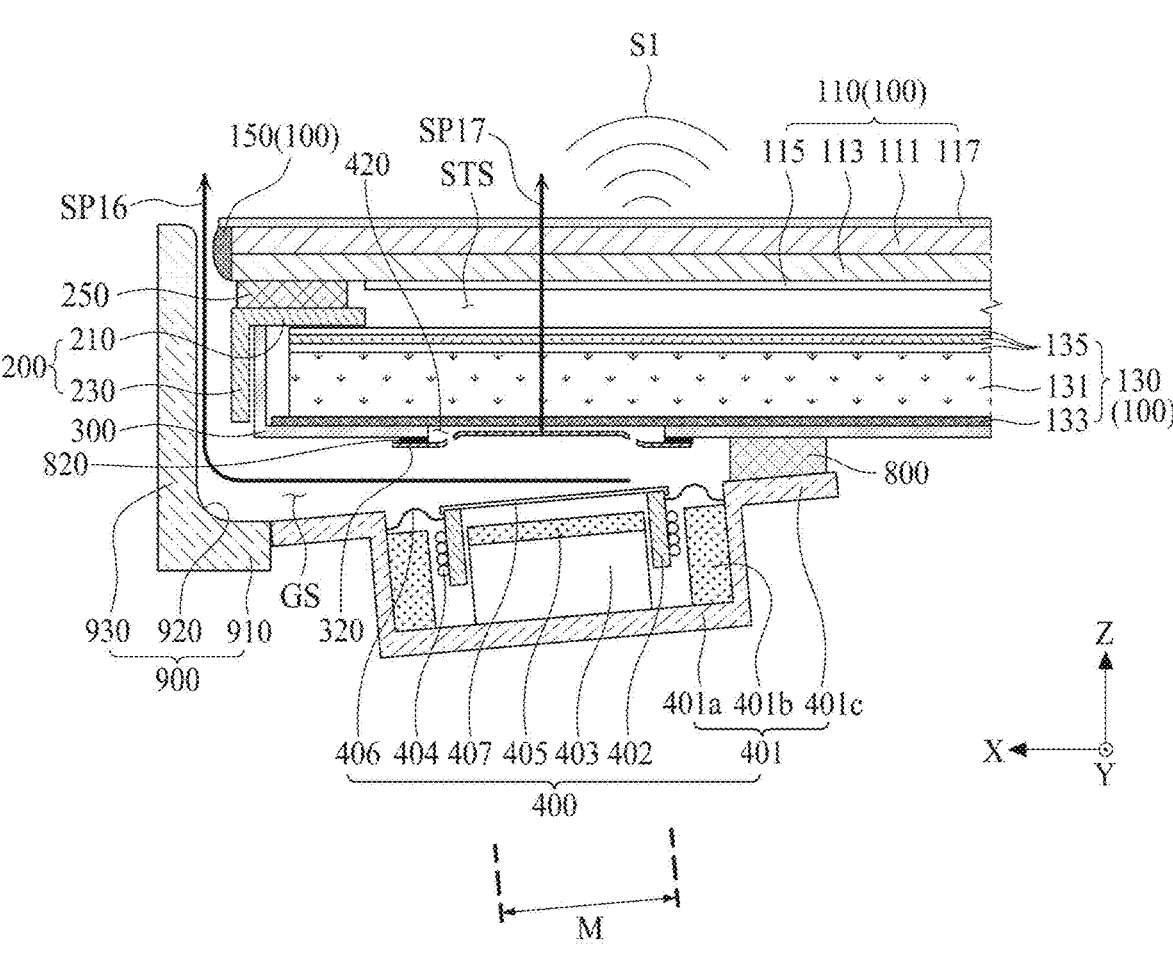
FIG. 18 illustrates a display apparatus according to another embodiment of the present disclosure.

FIG. 17 illustrates a display apparatus according to another embodiment of the present disclosure. FIG. 18 illustrates a display apparatus according to another embodiment of the present disclosure. FIGS. 17 and 18 illustrate an embodiment of the present disclosure implemented by modifying a structure of a rear cover in the display apparatus illustrated in FIGS. 9 and 15. Hereinafter, therefore, a rear cover will be described in detail, the other elements are referred to by the same reference numerals as FIGS. 9 and 15, and their repetitive descriptions are omitted or will be briefly given.

With reference to FIGS. 17 and 18, a vibration generating module 400 may be disposed to be inclined with respect to a rear surface of a rear cover 300. For example, the vibration generating module 400 may be disposed to be inclined by a second connection member 800 whose one side (or portion) is open. For example, the vibration generating module 400 may be inclined by a height of the second connection member 800. For example, the second connection member 800 may have a height which is progressively reduced from one side (or portion) thereof to the other side (or portion) opposite to the one side (or portion). For example, the second connection member 800 may include a first side parallel to the one side (or portion) thereof, a second side connected to one end (or portion) of the first side, and a third side connected to the other end (or portion) of the first side in parallel with the second side, and a height of each of the second side and the third side may have a lower height (a thickness) as it nears the first side.

For example, a degree to which the vibration generating module 400 is inclined may vary from one side (or portion) of the rear cover 300 to the other side (or portion) thereof so that a sound output at a side surface of the display module 100 is enhanced. For example, when a side at which the second connection member 800 is disposed is the one side (or portion) of the rear cover 300, a degree to which the vibration generating module 400 is inclined may increase from the one side (or portion) of the rear cover 300 to the other side (or portion) thereof. For example, a degree to which the vibration generating module 400 is inclined may increase from a center portion of the rear cover 300 to a side (or sidewall) thereof. Therefore, a sound of the vibration generating module 400 may be efficiently output at the other side (or portion) of the second connection member 800 whose the one side (or portion) is open.

A rear cover 300 according to another embodiment of the present disclosure may be disposed in a region except a magnetic field region M corresponding to a magnet member 403 of the vibration generating module 400. For example, the rear cover 300 may be disposed in a region except a magnetic field region M corresponding to a magnet member 403 of each of first and second sound generating devices 410 and 430. For example, a portion except the magnetic field region M may be a second hole 420 of the rear cover 300. The rear cover 300 may include an elecytroplated steel sheet (for example, an electrolytically galvanized steel sheet (EGI) or an iron (Fe)-based material. For example, the elecytroplated steel sheet may be formed by electrically plating zinc (Zn). Therefore, the rear cover 300 may be disposed in a region except the magnetic field region M of the vibration generating module 400, and thus, an influence of a magnetic field caused by the rear cover 300 may be reduced on the vibration generating module 400, thereby enhancing a sound characteristic of the vibration generating module 400.

According to another embodiment of the present disclosure, a second rear cover 320 disposed on a rear surface of a rear cover 300 may be further provided. For example, the second rear cover 320 may be disposed between the rear cover 300 and the vibration generating module 400. For example, the second rear cover 320 may be disposed between the rear cover 300 and first and second sound generating devices 410 and 430. For example, the second rear cover 320 may overlap a portion of the rear cover 300. For example, the second rear cover 320 may be disposed in a magnetic field region M corresponding to the magnet member 403 of the vibration generating module 400. For example, the second rear cover 320 may be disposed in a magnetic field region M corresponding to the magnet member 403 of each of the first and second sound generating devices 410 and 430.

For example, the second rear cover 320 may include nonferrous metal so as to decrease an influence of a magnetic field caused by the rear cover 300 on the vibration generating module 400. For example, the second rear cover 320 may include nonferrous metal so as to decrease an influence of a magnetic field caused by the rear cover 300 on the first and second sound generating devices 410 and 430. For example, the second rear cover 320 may include a material other than an iron (Fe)-based materials included in the magnet member 403. For example, the second rear cover 320 may include one of an Al material, a Mg alloy material, a Mg—Li alloy material, and an Al alloy material. However, embodiments of the present disclosure are not limited thereto, and the second rear cover 320 may be made a material that does not the iron (Fe) material. Therefore, an influence of a magnetic field caused by the rear cover 300 may be reduced on the vibration generating module 400, and thus, a sound loss of the vibration generating module 400 may be reduced, thereby enhancing a sound characteristic of the vibration generating module 400. For example, an influence of a magnetic field caused by the rear cover 300 may be reduced on the first and second sound generating devices 410 and 430, and a sound characteristic of each of the first and second sound generating devices 410 and 430 may be enhanced.

For example, the rear cover 300 may include at least one second hole 420. For example, the rear cover 300 may include at least one second hole 420 overlapping the second rear cover 320. The at least one second hole 420 may overlap the rear cover 300 and the second rear cover 320.

A third connection member 820 may be further provided between the rear cover 300 and the second rear cover 320. The third connection member 820 may be an adhesive. For example, the adhesive may be a single-sided adhesive, a single-sided foam adhesive, a single-sided tape, a single-sided foam tape, a double-sided adhesive, a double-sided foam adhesive, a double-sided tape, a double-sided foam tape, or a pressure sensitive adhesive (PSA), but embodiments of the present disclosure are not limited thereto.

With reference to FIG. 17, the second rear cover 320 and the rear cover 300 may be disposed on the same plane. For example, a height and/or a shape of the second rear cover 320 disposed near the second hole 420 may be adjusted for more enhancing a sound reflected by the vibration generating module 400. For example, a height and/or a shape of the second rear cover 320 disposed near the second hole 420 may be adjusted for more enhancing a sound reflected by each of the first and second sound generating devices 410 and 430.

With reference to FIG. 18, the second rear cover 320 may be disposed between second holes 420 of the rear cover 300. For example, the second rear cover 320 may be disposed between the rear cover 300 and the vibration generating module 400. For example, the second rear cover 320 may be disposed between the rear cover 300 and the first and second sound generating devices 410 and 430. For example, the second rear cover 320 and/or the rear cover 300 may be implemented in a forming shape, and thus, a manufacturing process may be simplified. The second hole 420 may be formed by forming a slit in the second rear cover 320. For example, since the second rear cover 320 and the rear cover 300 are formed in a forming shape, a region where a sound of the vibration generating module 400 is reflected may more increase. For example, a height and/or a shape of the second rear cover 320 disposed near the second hole 420 may be adjusted for more enhancing a sound reflected by the vibration generating module 400.

For example, the connection member 800 whose one side (or portion) or one side surface is open, the rear cover 300 including at least one second hole 420, and/or the second rear cover 320 may include a sound guide structure which guides a sound of the first and second sound generating devices 410 and 430 so to be output in a forward direction or a lateral direction of the display module 100. For example, the rear cover 300 including the at least one second hole 420 and/or the second rear cover 320 may include a sound guide structure which guides the sound of the first and second sound generating devices 410 and 430 so to be output in the forward direction or the lateral direction of the display module 100. For example, the rear cover 300 including the at least one second hole 420 and/or the second rear cover 320, and the structure 900 may include a sound guide structure which guides the sound of the first and second sound generating devices 410 and 430 so to be output in the forward direction or the lateral direction of the display module 100. For example, the rear cover 300 including the at least one second hole 420, the second rear cover 320, and/or the structure 900 may include a sound guide structure which guides the sound of the first and second sound generating devices 410 and 430 so to be output in the forward direction or the lateral direction of the display module 100. For example, the connection member 800 whose one side (or portion) or one side surface is open, the rear cover 300 including at least one second hole 420, the second rear cover 320, and/or the structure 900 may include a sound guide structure which guides the sound of the first and second sound generating devices 410 and 430 so to be output in the forward direction or the lateral direction of the display module 100.

For example, the sound of the vibration generating module 400 may be reflected between the vibration generating module 400 and a rear surface of the rear cover 300 and may be output in the forward direction of the display module 100. For example, the sounds of the first and second sound generating devices 410 and 430 may be reflected between the first and second sound generating devices 410 and 430 and the rear surface of the rear cover 300 and may be output in the forward direction of the display module 100. For example, the sound of the vibration generating module 400 may be reflected between the vibration generating module 400 and a rear surface of the rear cover 300 corresponding to the magnetic field region M and may be output in the forward direction of the display module 100. For example, the sounds of the first and second sound generating devices 410 and 430 may be reflected between the vibration generating module 400 and a rear surface of the rear cover 300 corresponding to the magnetic field region M and may be output in the forward direction of the display module 100. For example, the sounds of the vibration generating module 400 may be reflected by a side surface of the structure 900 and may be output in the forward direction of the display module 100. For example, the sounds of the first and second sound generating devices 410 and 430 may be reflected by a side surface of the structure 900 and may be output in the forward direction of the display module 100. For example, since the connection member 800 whose one side (or portion) or one side surface is open is provided, the sound of the vibration generating module 400 may be output in the lateral direction, thereby enhancing a sound of the high-pitched sound band. For example, since the connection member 800 whose one side (or portion) or one side surface is open is provided, the sound of the vibration generating module 400 may be output in the lateral direction, and a region where a sound between the rear cover 300 and the vibration generating module 400 is reflected may be increased by the inclined vibration generating module 400, thereby enhancing a sound of the high-pitched sound band. Therefore, a region where the sound of the vibration generating module 400 is reflected may increase due to a sound reflected by the rear cover 300, the sound may be reflected by the side surface of the structure 900 and may be output in the forward direction of the display module 100, and the sound may be reflected from the magnetic field region M and may be output in the forward direction of the display module 100, thereby more enhancing a sound of the high-pitched sound band. For example, a region where the sounds of the first and second sound generating devices 410 and 430 are reflected may increase due to a sound reflected by the rear cover 300, the sounds may be reflected by the side surface of the structure 900 and may be output in the forward direction of the display module 100, and the sounds may be reflected from the magnetic field region M and may be output in the forward direction of the display module 100, thereby more enhancing a sound of the high-pitched sound band.

With reference to FIG. 17, a path of the sound generated by the vibration generating module 400 may be a fourteenth sound path SP14. For example, a path of the sounds generated by the first sound generating device 410 and the second sound generating device 430 may be the fourteenth sound path SP14. For example, the fourteenth sound path SP14 may be a forward direction (or a thickness direction of the display module) and a lateral direction in which a sound is reflected by the rear surface of the display module 100. For example, the fourteenth sound path SP14 may be a forward direction and a lateral direction in which a sound is reflected from the gap space GS (or the sound outputting space) between the vibration generating module 400 and the rear cover 300, and may be a forward direction in which a sound is reflected by a side surface of the structure 900. For example, the fourteenth sound path SP14 may be a forward direction and a lateral direction in which a sound is reflected from the gap space GS (or the sound outputting space) between the vibration generating module 400 and the rear cover 300, and may be a forward direction and a lateral direction in which a sound is output through the second connection member 800. For example, the fourteenth sound path SP14 may be a lateral direction and a forward direction in which a sound is reflected from the magnetic field region M and/or the second hole 420, and may be a forward direction in which a sound is reflected by the structure 900.

With reference to FIG. 17, the sound of the vibration generating module 400 may be output through or via the second hole 420 in the forward direction of the display module 100. For example, the sounds of the first and second sound generating devices 410 and 430 may be output through or via the second hole 420 in the forward direction of the display module 100. For example, a path of the sound generated by the vibration generating module 400 through or via the second hole 420 may be a fifteenth sound path SP15. For example, a path of each of sounds generated by the first sound generating device 410 and the second sound generating device 430 through or via the second hole 420 may be the fifteenth sound path SP15. For example, the fifteenth sound path SP15 may be a forward direction (or a thickness direction of the display module) in which a sound is output by the rear surface of the display module 100 through or via the second hole 420 and/or the magnetic field region M. For example, the fifteenth sound path SP15 may be a forward direction in which a sound is output in a gap space GS (or a sound outputting space) between the vibration generating module 400 and the rear cover 300. Therefore, a sound by the vibration generating module 400 may be output through or via the fourteenth sound path SP14 and the fifteenth sound path SP15, thereby providing a display apparatus for more enhancing a sound of the high-pitched sound band.

With reference to FIG. 18, a path of the sound generated by the vibration generating module 400 may be a sixteenth sound path SP16. For example, a path of the sounds generated by the first sound generating device 410 and the second sound generating device 430 may be the sixteenth sound path SP16. For example, the sixteenth sound path SP16 may be a forward direction (or a thickness direction of the display module) and a lateral direction in which a sound is reflected by the rear surface of the display module 100. For example, the sixteenth sound path SP16 may be a forward direction and a lateral direction in which a sound is reflected from the gap space GS (or the sound outputting space) between the vibration generating module 400 and the rear cover 300, and may be a forward direction in which a sound is reflected by a side surface of the structure 900. For example, the sixteenth sound path SP16 may be a forward direction and a lateral direction in which a sound is reflected from the gap space GS (or the sound outputting space) between the vibration generating module 400 and the rear cover 300, and may be a forward direction and a lateral direction in which a sound is output through or via the second connection member 800. For example, the sixteenth sound path SP16 may be a lateral direction and a forward direction in which a sound is reflected from the magnetic field region M and/or the second hole 420, and may be a forward direction in which a sound is reflected by the structure 900.

With reference to FIG. 18, the sound of the vibration generating module 400 may be output through or via the second hole 420 in the forward direction of the display module 100. For example, the sounds of the first and second sound generating devices 410 and 430 may be output through or via the second hole 420 in the forward direction of the display module 100. For example, a path of the sound generated by the vibration generating module 400 through or via the second hole 420 may be a seventeenth sound path SP17. For example, a path of sounds generated by the first sound generating device 410 and the second sound generating device 430 through or via the second hole 420 may be the seventeenth sound path SP17. For example, the seventeenth sound path SP17 may be a forward direction (or a thickness direction of the display module) in which a sound is output by the rear surface of the display module 100 through or via the second hole 420 and/or the magnetic field region M. For example, the seventeenth sound path SP17 may be a forward direction in which a sound is output in a gap space GS (or a sound outputting space) between the vibration generating module 400 and the rear cover 300. Therefore, a sound by the vibration generating module 400 may be output through or via the sixteenth sound path SP16 and the seventeenth sound path SP17, thereby providing a display apparatus for more enhancing a sound of the high-pitched sound band.

Although the structure 900 is not provided in FIGS. 17 and 18, a region where the sound of the vibration generating module 400 is reflected may be increased by a structure of the inclined vibration generating module 400, and/or the rear cover 300, and/or the second rear cover 320 and a sound reflected from the second hole or pattern 420, or the magnetic field region M may be output to the forward direction of the display module 100, thereby providing a display apparatus for enhancing a sound of the high-pitched sound band. For example, the sound of the vibration generating module 400 may be reflected by the inclined vibration generating module 400 to increase a sound diffracted in the high-pitched sound band, and the sound may travel in the forward direction of the display module 100, thereby providing a display apparatus for enhancing a sound of the high-pitched sound band.

Figure 19:
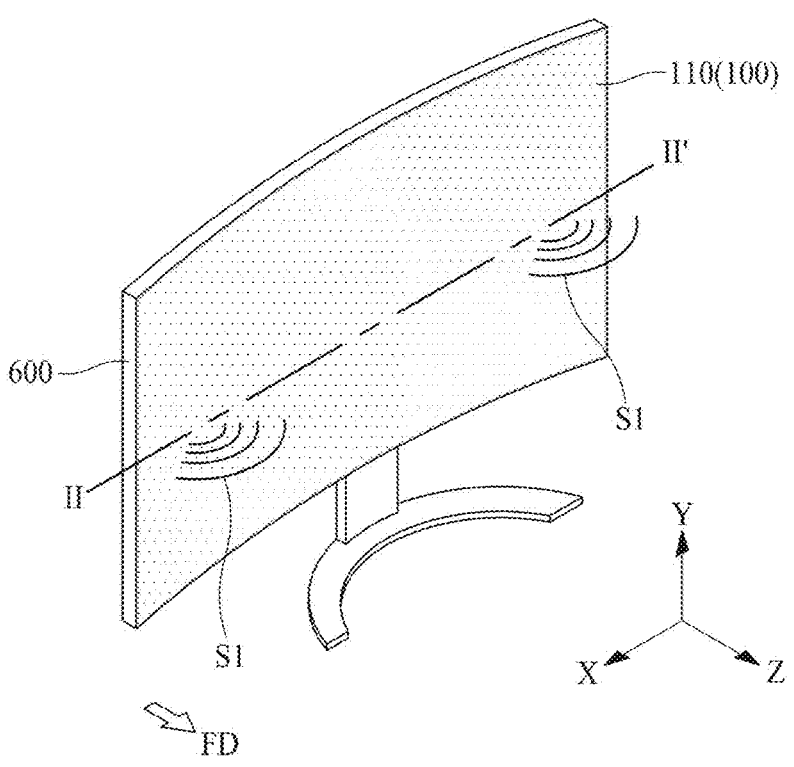
FIG. 19 illustrates a display apparatus according to another embodiment of the present disclosure.
Figure 20:
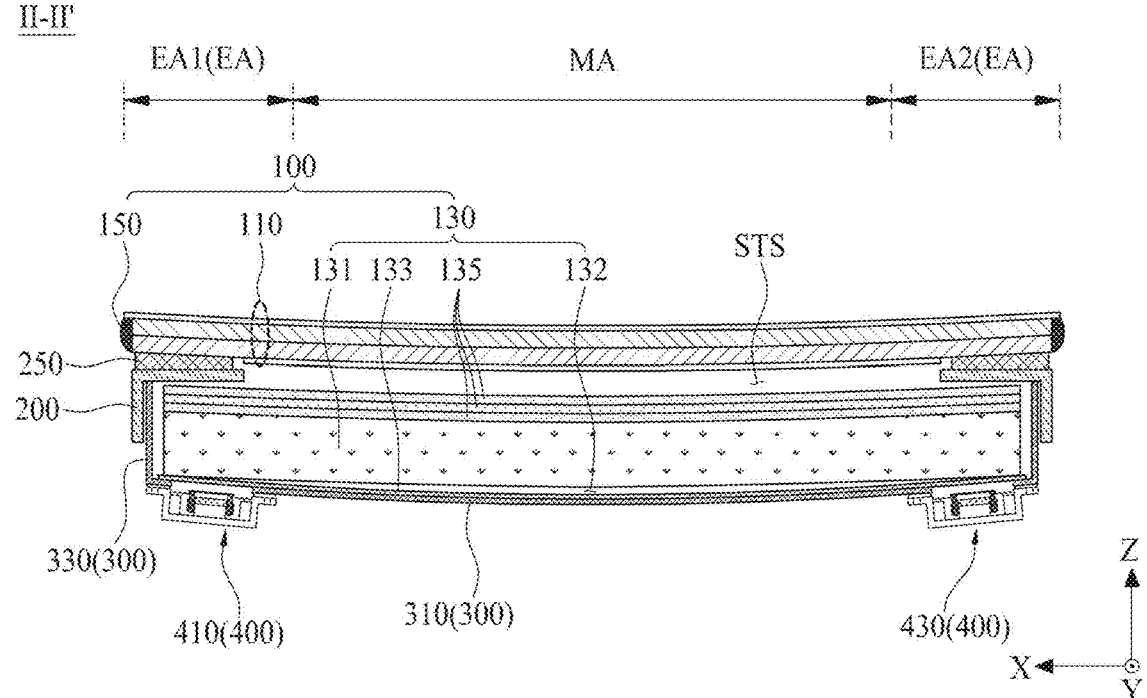
FIG. 20 is a cross-sectional view taken along line II-IT illustrated in FIG. 19.

FIG. 19 illustrates a display apparatus according to another embodiment of the present disclosure. FIG. 20 is a cross-sectional view taken along line II-IT illustrated in FIG. 19. FIGS. 19 and 20 illustrate an embodiment of the present disclosure implemented by modifying a structure of a rear cover and a backlight of the display apparatus illustrated in FIGS. 1 to 18. Hereinafter, therefore, a rear cover and a backlight will be described in detail, the other elements are referred to by the same reference numerals as FIGS. 1 to 18, and their repetitive descriptions are omitted or will be briefly given.

With reference to FIGS. 19 and 20, in a display apparatus according to another embodiment of the present disclosure, a rear cover 300 may support a backlight 130 of a display module 100 so that an inner air gap 132 is provided in the backlight 130.

The rear cover 300 according to an embodiment of the present disclosure may include a rear portion 310 which supports a rear surface of the display module 100 and a side portion 330 which is connected to a periphery of the rear portion 310 to support the supporting part 200.

The rear portion 310 may be disposed to cover the rear surface of the display module 100 and may be configured to support the display module 100. The rear portion 310 may support the backlight 130 of the display module 100 and may be configured to support a vibration generating module 400.

The rear portion 310 may include a cross-sectional structure having a concavely curved shape so that the inner air gap 132 is provided in the backlight 130. The inner air gap 132 of the backlight 130 may act as a sound box for a sound which is generated based on a vibration of the first vibration generating module 400 and is propagated, thereby enhancing a sound characteristic of the low-pitched sound band. Except for the cross-sectional structure having a concavely curved shape, the rear portion 310 may be substantially the same as the above-described rear part, and thus, a repetitive description of a structure other than the cross-sectional structure having a concavely curved shape is omitted.

The rear portion 310 according to an embodiment of the present disclosure may have a cup structure where a middle region MA of the display module 100 protrudes to a rear surface of the display apparatus, with respect to a first direction X (or a widthwise direction) of the display module 100. For example, a distance (or an interval) between an upper surface of the rear portion 310 and a rear surface of a display panel 110 may increase progressively from periphery regions EA1 and EA2 to the middle region MA, with respect to the first direction X (or the widthwise direction) of the display module 100.

In the rear portion 310 according to an embodiment of the present disclosure, a distance (or a depth) between a middle region MA of the rear portion 310 and a virtual planar surface (or a horizontal line) connecting one end and the other end of the rear portion 310 may be about 0.01% to 0.5% of a total length of the rear portion 310, with respect to a first direction X (or a widthwise direction) of the display module 100.

For example, when the depth of the middle region MA of the rear portion 310 is about 0% of the total length of the rear portion 310, the rear portion 310 may substantially have a plane structure, and for example, the inner air gap 132 may not be provided in the backlight 130. Also, when the depth of the middle region MA of the rear portion 310 is more than about 0.5% of the total length of the rear portion 310, a distance (or a size) of the inner air gap 132 in the backlight 130 may increase, and thus, the loss of a sound wave of the high-pitched sound band proportional to the distance may increase, whereby a sound of the middle-high-pitched sound band may not be realized or a sound wave of the middle-high-pitched sound band may be reduced, a sound of the middle-high-pitched sound band generated by the first vibration generating device 410 and a sound of a middle-low-pitched sound band generated by the second vibration generating device 430 may be separated from each other, and a thickness of the display apparatus may increase. Accordingly, the depth of the middle region MA of the rear portion 310 may be set to about 0.01% to 0.5% of the total length of the rear portion 310 so that the inner air gap 132 of the backlight 130 acts as a sound box for enhancing a sound characteristic of the low-pitched sound band. For example, a middle-pitched sound band may be 200 Hz to 3 kHz, but embodiments of the present disclosure are not limited thereto and may be 3 kHz to 5 kHz. The high-pitched sound band may be 3 kHz or more, but embodiments of the present disclosure are not limited thereto and may be 5 kHz or more.

A side portion 330 may be bent from a periphery of the rear portion 310 and may be configured to support a supporting part 200. The side portion 330 may provide a backlight accommodating space in the rear portion 310 and may surround side surfaces of the backlight 130 accommodated into (or supported by) the backlight accommodating space.

The backlight 130 may include a reflective sheet 133, a light guide part 131, a light source part, and an optical sheet part 135.

The reflective sheet 133 may be disposed on the rear portion 310 of the rear cover 300. The reflective sheet 133 may be disposed on the rear portion 310 to have a concave shape along a concave shape of the rear portion 310. For example, the reflective sheet 133 may be bent in a concave shape by a self-weight (or self-load) thereof, and thus, may be disposed in the rear portion 310 to have a conformal shape which is based on a shape of the rear portion 310. The reflective sheet 133 may reflect light, which is incident from the light guide part 131, to the light guide part 131 to minimize or reduce the loss of light.

The light guide part 131 may include a light incident surface which is disposed on the reflective sheet 133 to overlap the display panel 110 and is provided on at least one sidewall thereof. The light guide part 131 may include a light-transmitting plastic or glass material. The light guide part 131 may allow light, which is incident through the light incident surface from the light source part, to travel to the display panel 110.

The light guide part 131 according to an embodiment of the present disclosure may be disposed on the reflective sheet 133 to have a concave shape which is not based on a concave shape of the rear portion 310. For example, the light guide part 131 may be disposed on the reflective sheet 133 to have a non-conformal shape which is not based on a shape of the reflective sheet 133 (or the rear portion 310). Therefore, the backlight 130 may include an inner air gap 132 between the reflective sheet 133 and the light guide part 131. The inner air gap 132 may be provided between the light guide part 131 and the reflective sheet 133 overlapping a middle region MA of the display module 100. The reflective sheet 133 overlapping a periphery region EA of the display module 100 may contact a periphery of the light guide part 131, and thus, the inner air gap 132 may not be provided between the reflective sheet 133 and the periphery of the light guide part 131. The inner air gap 132 may be provided between the light guide part 131 and the reflective sheet 133 overlapping the middle region MA of the display module 100. Thus, the inner air gap 132 may act as a sound box for a sound which is generated based on a vibration of the vibration generating module 400 and is propagated, thereby enhancing a sound characteristic of the low-pitched sound band.

The light guide part 131 may be bent in a concave shape by a self-weight (or self-load) thereof and may be disposed on the reflective sheet 133.

For example, when a stiffness of the light guide part 131 is relatively low, the light guide part 131 may be bent in a shape which is based on a concave shape of the reflective sheet 133 (or the rear portion 310) and may be disposed on the reflective sheet 133, and thus, the inner air gap 132 may not be provided between the reflective sheet 133 and the light guide part 131. On the other hand, when a stiffness of the light guide part 131 is relatively high, the light guide part 131 may not be bent by the self-weight (or self-load) thereof and may be mounted or disposed on the reflective sheet 133 in a planar state, and thus, the inner air gap 132 may be provided between portions other than both ends of the reflective sheet 133 and the light guide part 131. For example, a distance (or a size) of the inner air gap 132 may increase, and thus, the loss of a sound wave of the high-pitched sound band proportional to the distance may increase, whereby a sound of the middle-high-pitched sound band may not be realized or a sound wave of the middle-high-pitched sound band may be reduced and a sound of the middle-high-pitched sound band generated by the first vibration generating device 410 and a sound of a middle-low-pitched sound band generated by the second vibration generating device 430 may be separated from each other. Accordingly, the light guide part 131 may be formed of a stiff material which is bent in a non-conformal shape which is not based on a concave shape of the reflective sheet 133 (or the rear portion 310) and is disposed on the reflective sheet 133, for providing the inner air gap 132 between the light guide part 131 and the reflective sheet 133 overlapping the middle region MA of the display module 100.

The light source part may irradiate light onto the light incident surface in the light guide part 131. The light source part may be disposed in the rear cover 300 to overlap a periphery region EA of the display panel 110. The light source part according to an embodiment of the present disclosure may include a plurality of light emitting diode (LED) devices which are mounted on a printed circuit board (PCB) for light source and irradiate lights onto the light incident surface.

The optical sheet part 135 may be on a front surface of the light guide part 131 and may enhance a luminance characteristic of light output from the light guide part 131. The optical sheet part 135 may be disposed on the light guide part 131 to have a conformal shape which is based on a concave shape of the light guide part 131.

Therefore, the display apparatus according to an embodiment of the present disclosure may have the same effect as that of the display apparatus illustrated in FIGS. 1 to 18. Also, in the display apparatus according to the present embodiment, the inner air gap 132 provided between the reflective sheet 133 and the light guide part 131 of the backlight 130 may act as a sound box by using the rear portion 310 of the rear cover 300 having a cross-sectional structure having a concavely curved shape, thereby more enhancing a sound characteristic of the low-pitched sound band.

Figure 21:
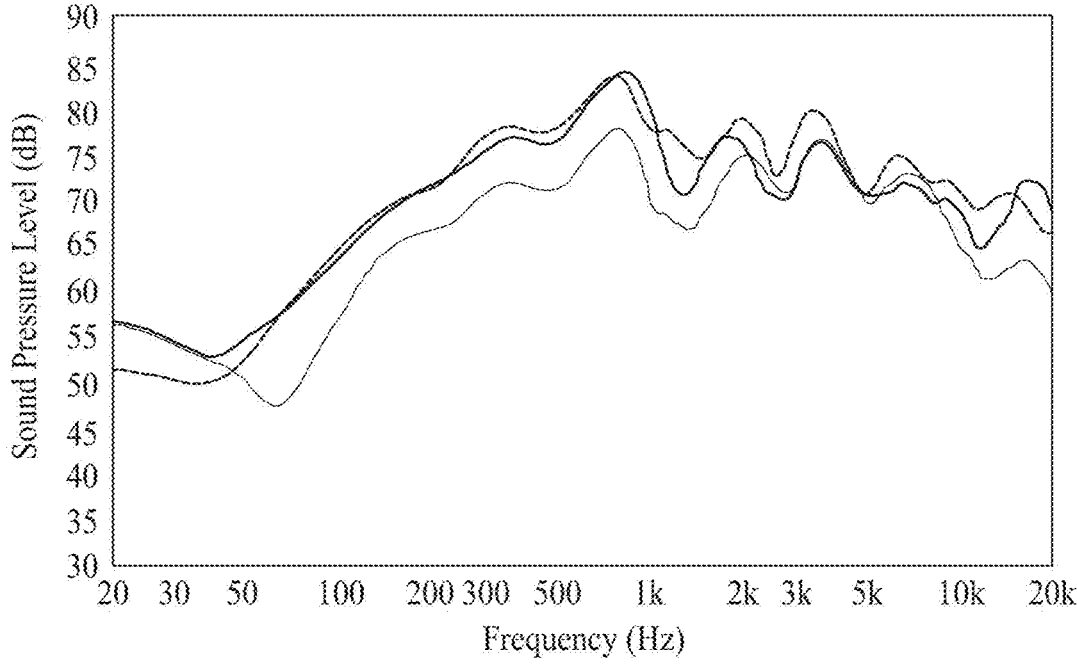
FIG. 21 is a graph showing a sound output characteristic of a display apparatus according to an embodiment of the present disclosure.

FIG. 21 is a graph showing a sound output characteristic of a display apparatus according to an embodiment of the present disclosure. In FIG. 21, a thin solid line represents a frequency-sound pressure level characteristic of a display apparatus (or a display apparatus of a comparative example) including a connection member where one side (or portion) thereof is not open in the display apparatus of FIG. 6. A thick solid line represents a frequency-sound pressure level characteristic of the display apparatus of FIG. 8. A dotted line represents a frequency-sound pressure level characteristic of the display apparatus of FIG. 17. In FIG. 21, the abscissa axis represents a frequency (Hz), and the ordinate axis represents a sound pressure level (dB). A sound pressure level shown in FIG. 21 has been measured by using Audio Precision company's APX525 audio analyzer (FFT analyzer), and moreover, has been measured under a condition where an applied voltage is 3 Vrms, a sine sweep is applied at 20 Hz to 20 kHz, and a distance between a display panel and a measurement position is 0.5 m. The sine sweep may be a method of performing sweep for a short time, but a method is not limited thereto.

With reference to FIG. 21, comparing with the display apparatus of the comparative example, it may be seen that, in the display apparatuses of FIGS. 8 and 17, a sound pressure level is enhanced in a low-pitched sound level of 200 Hz or less. For example, comparing with the display apparatus of the comparative example, it may be seen that, in the display apparatuses of FIGS. 8 and 17, a sound pressure level in 200 Hz or less is enhanced by about 10 dB or more. Accordingly, comparing with the display apparatus of the comparative example, it may be seen that, in the display apparatuses of FIGS. 8 and 17, a sound pressure level of the low-pitched sound band is enhanced. For example, since a rear cover includes nonferrous metal, it may be seen that a sound pressure level of the low-pitched sound band is enhanced.

Moreover, comparing with the display apparatus of the comparative example, it may be seen that, in the display apparatuses of FIGS. 8 and 17, a sound pressure level in a middle-pitched sound band of 200 Hz to 3 kHz is enhanced by about 5 dB to about 8 dB or more. Comparing with the display apparatus of the comparative example, it may be seen that, in the display apparatuses of FIGS. 8 and 17, a sound pressure level in a high-pitched sound band of 3 kHz or more is enhanced by about 5 dB to about 7 dB or more. Therefore, in a display apparatus according to an embodiment of the present disclosure, it may be seen that a sound of the high-pitched sound band is enhanced. For example, although a piezoelectric vibration device where an output of the high-pitched sound band is strong is not provided, a display apparatus including a vibration generating module for outputting a sound of the high-pitched sound band may be provided. Accordingly, a display apparatus including a vibration generating module for enhancing a sound of the low-pitched sound band to the high-pitched sound band may be provided.

A display apparatus according to an embodiment of the present disclosure may be applied to various applications which output sound on the basis of a vibration of a display module without a separate speaker. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wallpaper display apparatuses, signage apparatuses, game machines, notebook computers, monitors, cameras, camcorders, home appliances, etc. Also, the flexible vibration module according to an embodiment of the present disclosure may be applied to organic light emitting lighting devices or inorganic light emitting lighting devices. Also, in a case where the flexible vibration module according to an embodiment of the present disclosure is applied to a mobile apparatus, the flexible vibration module may act as a speaker or a receiver.

A display apparatus according to an embodiment of the present disclosure will be described below.

A display apparatus according to an embodiment of the present disclosure includes a display module including a display panel and configured to display an image, a rear cover at a rear surface of the display module, and a vibration generating module at a rear region of the rear cover, wherein the vibration generating module is configured to output sound in a forward direction and a lateral direction of the display module.

According to some embodiments of the present disclosure, the vibration generating module may be disposed at a rear periphery of the rear cover and may be spaced apart from a rear surface of the rear cover, and the sound output from the vibration generating module is output in the forward direction and the lateral direction of the display module.

According to some embodiments of the present disclosure, the display apparatus may further include at least one hole communicating with a space between the rear periphery of the rear cover and the vibration generating module.

According to some embodiments of the present disclosure, the vibration generating module may be disposed to be inclined with respect to a rear surface of the rear cover.

According to some embodiments of the present disclosure, the rear cover may be disposed to be inclined with respect to the vibration generating module.

A display apparatus according to an embodiment of the present disclosure includes a display module including a display panel and configured to display an image, a rear cover at a rear surface of the display module, and a vibration generating module at a rear region of the rear cover and configured to output a sound to the display module, wherein the rear cover and the vibration generating module are disposed in non-parallel.

According to some embodiments of the present disclosure, the vibration generating module may be disposed non-parallel with respect to a rear surface of the rear cover, and/or the rear cover may be disposed non-parallel with respect to the vibration generating module.

According to some embodiments of the present disclosure, the display apparatus may further include a connection member between the vibration generating module and the rear cover, one portion of the connection member being open, wherein a sound of the vibration generating module may be output in a lateral direction of the display module through the one portion of the connection member.

According to some embodiments of the present disclosure, the rear cover may include one or more holes overlapping the vibration generating module.

According to some embodiments of the present disclosure, the rear cover may include a plurality of holes overlapping the vibration generating module, and the plurality of holes may vary toward a center portion of the rear cover.

According to some embodiments of the present disclosure, the rear cover may include a plurality of holes overlapping the vibration generating module, and the plurality of holes may vary from one portion of the rear cover to the other portion thereof.

According to some embodiments of the present disclosure, the rear cover may include a plurality of patterns overlapping the vibration generating module, and the plurality of patterns may vary toward a center portion of the rear cover.

According to some embodiments of the present disclosure, the rear cover may include a plurality of patterns, and the plurality of patterns may vary from one portion of the rear cover to the other portion thereof.

According to some embodiments of the present disclosure, the display apparatus may further include a second rear cover between the rear cover and the vibration generating module and a hole overlapping the rear cover and the second rear cover.

According to some embodiments of the present disclosure, the second rear cover may include at least one hole.

According to some embodiments of the present disclosure, the second rear cover may be disposed at a portion except a magnetic field region of the vibration generating module.

According to some embodiments of the present disclosure, the second rear cover may be disposed to overlap a portion of the rear cover and a portion except a magnetic field region of the vibration generating module.

According to some embodiments of the present disclosure, the rear cover and the second rear cover may include different materials.

According to some embodiments of the present disclosure, the second rear cover may include nonferrous metal.

According to some embodiments of the present disclosure, the display apparatus may further include a structure at one portion of the display module, wherein a sound of the vibration generating module is reflected by the structure and is output in a forward direction of the display module.

According to some embodiments of the present disclosure, the structure includes a bottom portion on a rear surface of the rear cover, a side portion spaced apart from one portion of the display module and connected to the bottom portion, and a sound guide portion between the bottom portion and the side portion.

According to some embodiments of the present disclosure, the rear cover may include a rear portion on the rear surface of the display module and a side portion configured to support the display module, and the rear portion may include a cross-sectional structure having a concavely curved shape.

According to some embodiments of the present disclosure, the rear cover may include a first rear region and a second rear region, and the vibration generating module may include a first sound generating device at the first rear region and a second sound generating device at the second rear region.

According to some embodiments of the present disclosure, a distance between a middle region of the rear portion and a virtual planar surface connecting one end and the other end of the rear portion may be 0.01% to 0.5% of a total length of the rear portion.

According to some embodiments of the present disclosure, the display apparatus may further include a reflective sheet on the rear portion to have a concave shape along a concave shape of the rear portion.

According to some embodiments of the present disclosure, the display apparatus may further include a light guide part on the reflective sheet with an inner air gap between the reflective sheet and the light guide part.

It will be apparent to those skilled in the art that various modifications and variations may be made in the display apparatus of the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:

a display module including a display panel and configured to display an image;

a rear cover at a rear surface of the display module;

a vibration generating device at a rear region of the rear cover;

a space between a rear surface of the rear cover and the vibration generating device;

an acoustically reflective structure configured at one portion of the display module to be connected to the space; and a connection member configured to provide the space between the vibration generating device and the rear surface of the rear cover, wherein a sound of the vibration generating device is reflected by the acoustically reflective structure and is output in a forward direction of the display module, wherein the connection member is between the vibration generating device and the rear surface of the rear cover, the connection member including an opening portion which is provided at a side surface of the connection member, and wherein the sound of the vibration generating device is transferred to the rear surface of the display module and is output to the acoustically reflective structure along a lateral direction of the display module through the space and the opening portion of the connection member.

2. The display apparatus of claim 1, wherein the acoustically reflective structure comprises:

a bottom portion at the rear surface of the rear cover;

a side portion being spaced apart from one portion of the display module and connected to the bottom portion; and a sound guide portion between the bottom portion and the side portion.

3. The display apparatus of claim 2, wherein the sound guide portion is implemented in a curve shape or a corner-rounded shape at a corner portion between the bottom portion and the side portion.

4. The display apparatus of claim 1, wherein a sound of the vibration generating device is transferred to the rear surface of the display module via the space and is configured to output in the forward direction and the lateral direction of the display module through the space.

5. The display apparatus of claim 1, wherein the vibration generating device is disposed to be inclined with respect to the rear surface of the rear cover and the space spreads to the lateral direction.

6. The display apparatus of claim 5, wherein the vibration generating device is inclined by a height of the connection member.

7. The display apparatus of claim 6, wherein the connection member has a height which is progressively reduced from one portion of the connection member to the other portion opposite to the one portion.

8. The display apparatus of claim 7, wherein the connection member comprises:

a first side parallel to the one portion of the connection member;

a second side connected to one end of the first side; and a third side connected to the other end opposite to the one end of the first side in parallel with the second side.

9. The display apparatus of claim 8, wherein a height of each of the second side and the third side has a less height as it nears the first side than far away from the first side.

10. The display apparatus of claim 1, wherein the rear cover comprises one or more holes overlapping the vibration generating device.

11. The display apparatus of claim 1, wherein:

the rear cover comprises a plurality of holes overlapping the vibration generating device; and the plurality of holes vary toward a center portion of the rear cover.

12. The display apparatus of claim 1, wherein:

the rear cover comprises a plurality of patterns overlapping the vibration generating device; and the plurality of patterns vary toward a center portion of the rear cover.

13. The display apparatus of claim 1, wherein:

the rear cover comprises a plurality of patterns; and the plurality of patterns vary from one portion of the rear cover to the other portion of the rear cover.

14. The display apparatus of claim 1, wherein:

the rear cover comprises a plurality of holes overlapping the vibration generating device; and the sound output from the vibration generating device is transferred to the rear surface of the display module via the plurality of holes of the rear cover.

15. The display apparatus of claim 14, wherein the rear cover is disposed non-parallel to the vibration generating device.

16. The display apparatus of claim 14, wherein the plurality of holes have a height which is progressively decreased from a rear center of the rear cover to a rear periphery of the rear cover.

17. The display apparatus of claim 1, wherein:

the rear cover comprises at least one hole overlapping the vibration generating device, and the sound output from the vibration generating device is transferred to the rear surface of the display module via the at least one hole of the rear cover.

18. The display apparatus of claim 17, further comprising an another rear cover between the rear cover and the vibration generating device, wherein the at least one hole of the rear cover overlaps the another rear cover and the vibration generating device.

19. The display apparatus of claim 18, wherein the another rear cover comprises at least one hole.

20. The display apparatus of claim 18, wherein:

the vibration generating device includes a magnet member, and the another rear cover is disposed to overlap a portion of the rear cover and the magnet member.

21. The display apparatus of claim 18, wherein:

the rear cover and the another rear cover comprise different materials, or the another rear cover comprises nonferrous metal.

22. The display apparatus of claim 17, wherein:

the vibration generating device includes a magnet member, the rear cover is disposed at a portion except a magnetic field region of the magnet member, and the at least one hole of the rear cover overlaps the magnetic field region of the magnet member.

23. The display apparatus of claim 1, wherein the rear cover comprises:

a rear portion at the rear surface of the display module; and a side portion configured to support the display module.

24. The display apparatus of claim 23, wherein a distance between a middle region of the rear portion and a virtual planar surface connecting one end and the other end of the rear portion is 0.01% to 0.5% of a total length of the rear portion.

25. The display apparatus of claim 23, wherein:

the display module further comprises:

a backlight between a rear surface of the display panel and the rear cover; and a sound transfer space between the display panel and the backlight, and the display panel is configured to vibrate by a vibration transferred through the sound transfer space according to a vibration of the backlight based on a vibration of the vibration generating device and to output the sound.

26. The display apparatus of claim 25, wherein:
the backlight comprises:
a reflective sheet on the rear portion;
a light guide part on the reflective sheet; and
an optical sheet part on the light guide part, and
the rear cover comprises a cross-sectional structure having a concavely curved shape to provide an inner air gap between the reflective sheet and the light guide part.

27. The display apparatus of claim 1, wherein:
the rear cover comprises a first rear region and a second rear region; and
the vibration generating device comprises a first sound generating device at the first rear region and a second sound generating device at the second rear region.

28. A display apparatus, comprising:
a display module including a display panel and configured to display an image;
a rear cover at a rear surface of the display module;
a vibration generating device at a rear region of the rear cover;
a space between a rear surface of the rear cover and the vibration generating device; and
an acoustically reflective structure configured at one portion of the display module to be connected to the space, wherein:
a sound of the vibration generating device is reflected by the acoustically reflective structure and is output in a forward direction of the display module;
the rear cover comprises a plurality of holes overlapping the vibration generating device; and
the plurality of holes vary from one portion of the rear cover to the other portion of the rear cover.

29. A display apparatus, comprising:
a display module including a display panel and configured to display an image;
a rear cover at a rear surface of the display module;
a vibration generating device at a rear region of the rear cover;
a space between a rear surface of the rear cover and the vibration generating device;
an acoustically reflective structure configured at one portion of the display module to be connected to the space;
an another rear cover between the rear cover and the vibration generating device; and
a hole overlapping the rear cover and the another rear cover,
wherein a sound of the vibration generating device is reflected by the acoustically reflective structure and is output in a forward direction of the display module.

30. The display apparatus of claim 29, wherein the another rear cover comprises at least one hole.

31. The display apparatus of claim 29, wherein the another rear cover is disposed at a portion except a magnetic field region of the vibration generating device.

32. The display apparatus of claim 29, wherein the another rear cover is disposed to overlap a portion of the rear cover and a portion except a magnetic field region of the vibration generating device.

33. The display apparatus of claim 29, wherein:
the rear cover and the another rear cover comprise different materials, or
the another rear cover comprises nonferrous metal.

* * * * *